United States Patent
Jolic et al.

(10) Patent No.: US 10,987,967 B2
(45) Date of Patent: Apr. 27, 2021

(54) MICRO-OPTIC DEVICE WITH DOUBLE SIDED OPTICAL EFFECT

(71) Applicant: CCL SECURE PTY LTD, Craigieburn (AU)

(72) Inventors: Karlo Ivan Jolic, Craigieburn (AU); Gary Fairless Power, Craigieburn (AU)

(73) Assignee: CCL Secure Pty Ltd, Craigieburn (AU)

(*) Notice: Subject to any disclaimer, the term of this patent is extended or adjusted under 35 U.S.C. 154(b) by 0 days.

(21) Appl. No.: 16/997,496

(22) Filed: Aug. 19, 2020

(65) Prior Publication Data

US 2020/0376881 A1    Dec. 3, 2020

Related U.S. Application Data

(63) Continuation of application No. 16/090,508, filed as application No. PCT/AU2017/050329 on Apr. 13, 2017, now Pat. No. 10,780,726.

(30) Foreign Application Priority Data

Apr. 13, 2016   (AU) ................ 2016100401

(51) Int. Cl.
| | |
|---|---|
| B42D 25/29 | (2014.01) |
| G02B 30/00 | (2020.01) |
| B42D 25/00 | (2014.01) |
| G02B 3/00 | (2006.01) |
| B42D 25/324 | (2014.01) |
| G02B 27/10 | (2006.01) |
| B42D 25/342 | (2014.01) |
| G02B 30/27 | (2020.01) |

(52) U.S. Cl.
CPC ............. *B42D 25/29* (2014.10); *B42D 25/00* (2014.10); *B42D 25/324* (2014.10); *B42D 25/342* (2014.10); *G02B 3/005* (2013.01); *G02B 3/0056* (2013.01); *G02B 3/0068* (2013.01); *G02B 27/10* (2013.01); *G02B 30/00* (2020.01)

(58) Field of Classification Search
CPC ...... B42D 25/29; B42D 25/00; B42D 25/324; B42D 25/342; G02B 3/005; G02B 30/00; G02B 3/0056; G02B 3/0068; G02B 27/10
USPC ................................ 283/72, 74, 94, 98, 901
See application file for complete search history.

(56) References Cited

U.S. PATENT DOCUMENTS

| | | | |
|---|---|---|---|
| 2011/0000110 A1* | 1/2011 | Wang ................ | B42D 25/29 40/299.01 |
| 2013/0044362 A1* | 2/2013 | Commander ......... | B42D 25/29 359/291 |
| 2017/0165997 A1* | 6/2017 | Holmes .............. | B42D 25/425 |

FOREIGN PATENT DOCUMENTS

WO   WO-2016016638 A1 *  2/2016  ........... B42D 25/355

* cited by examiner

*Primary Examiner* — Justin V Lewis
(74) *Attorney, Agent, or Firm* — Christopher M. Scherer; DeWitt LLP

(57) ABSTRACT

A micro-optic device, including: a transparent substrate; first lens elements on a first side of the substrate that reveal first image elements on a second side of the substrate; and second lens elements on the second side of the substrate that reveal second image elements on the first side of the substrate.

17 Claims, 18 Drawing Sheets

1st Embodiment

1st Embodiment

1st Embodiment

2nd Embodiment

2nd Embodiment

2nd Embodiment

3rd Embodiment

3rd Embodiment

4th Embodiment

5th Embodiment

5th Embodiment

6th Embodiment

6th Embodiment

6th Embodiment

6th Embodiment

6th Embodiment

6th Embodiment

7th Embodiment

7th Embodiment

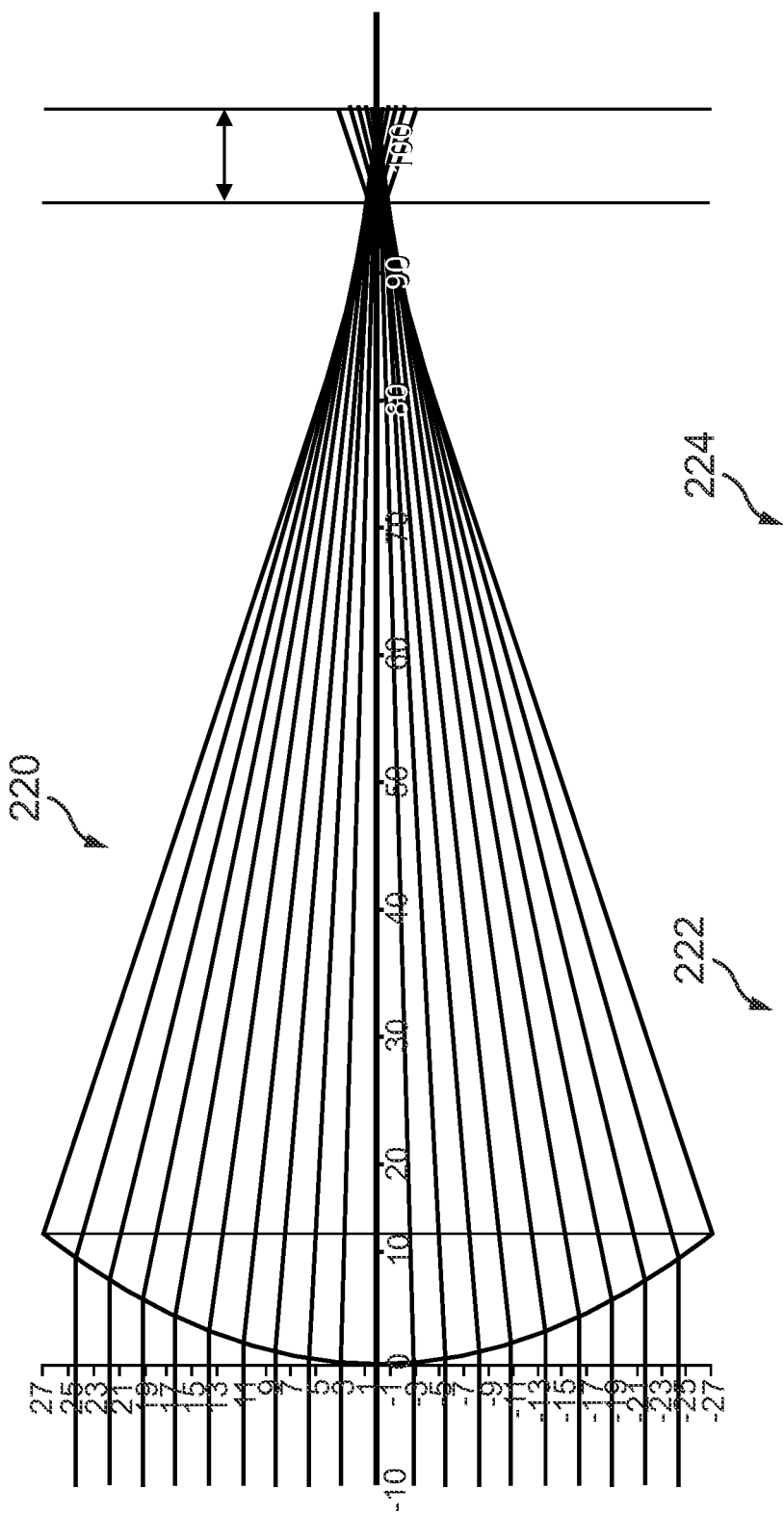
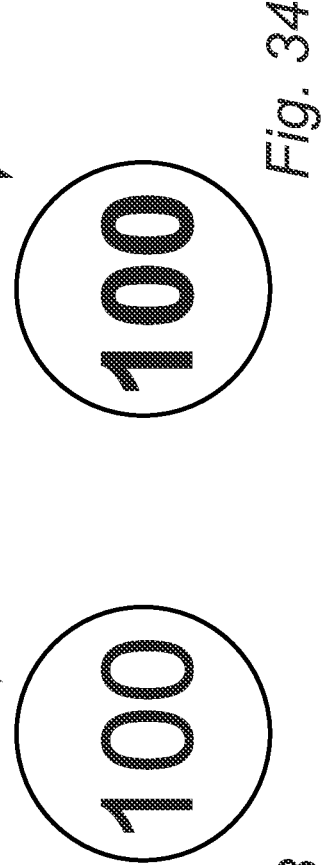
Fig. 32
Fig. 33
Fig. 34

MICRO-OPTIC DEVICE WITH DOUBLE SIDED OPTICAL EFFECT

CROSS-REFERENCE TO RELATED APPLICATIONS

The present application is a continuation of U.S. application Ser. No. 16/090,508, filed Oct. 1, 2018, which application is the U.S. national stage application of International Application No. PCT/AU2017/050329, filed Apr. 13, 2017, which international application was published on Oct. 19, 2017 as International Publication No. WO 2017/177276. The International Application claims priority to Australian Patent Application No. 2016100401, filed Apr. 13, 2016, the contents of which are incorporated herein by reference in their entireties.

TECHNICAL FIELD

The present invention relates to a micro-optic device for used in a micro-optic image presentation system. Embodiments of the invention can be used as a security device for bank notes and coins, credit cards, cheques, passports, identity cards, and the like, and it will be convenient to describe the invention in relation to that exemplary, non-limiting application.

BACKGROUND OF INVENTION

It is well known that many of the world's bank notes as well as other security documents bear security devices which produce optical effects enabling a visual authentication of the bank note. Some of these security devices include focusing elements, such as micro lenses or micro mirrors, which act to sample and magnify image elements and project imagery which is observable from a first viewing angle by a user.

In conventional micro-optical security features in polymer bank notes, the micro lenses and image elements with which the micro lenses interact to project imagery to a user are typically applied to opposite sides of the polymer substrate. In other words, the polymer substrate itself forms part of each micro lens, acting as an optical spacer, focusing light through the thickness of the bank note from the micro imagery layer to the eye.

Whilst this has certain advantages compared to providing lenses in threads, in that larger lenses can be used thereby enabling more complex images and effects to be produced, the disadvantage of such a configuration is that the feature occupies real estate on both sides of the polymer bank note and yet enables imagery to be projected from one side of the polymer bank note only. That is, the micro-optical effects are typically only able to be viewed from one side of the banknote, namely the side with the lenses even though they occupy space on both sides of the substrate.

Furthermore, the real estate occupied by the image elements typically cannot be overprinted with typical bank note design artwork because to do so would compromise the appearance of the optical effects, viewable from the lens side only. In other words, the overprinted art work can be visible from the lens side particularly if the overprinting colour used is dark. This phenomenon is known as "show-through" and can severely limit which designs are possible to use in such "dead" areas of the banknote, where the image elements of the lens security feature are located.

It would be desirable to provide a micro-optic device notably for a security document which better utilises space available for security/authentication purposes and enables the micro-optic device to be more reasonably integrated into the security document from a design perspective.

It would also be desirable to provide a micro-optic device notably for a security document that enabled optical effects to be generated which are viewable from both sides of the security document for security/authentication purposes.

It would also be desirable to provide a micro-optic device that ameliorates or overcomes one or more disadvantages or inconveniences of known micro-optic devices.

SUMMARY OF INVENTION

One aspect of the invention provides a micro-optic device, including: a transparent substrate; a plurality of first revealing elements on a first side of the substrate that magnify first image elements on a second side of the substrate; and a plurality of second revealing elements on the second side of the substrate that magnify second image elements on the first side of the substrate, wherein the revealing elements and image elements on each side consist of strips of revealing regions interleaved with strips of image regions.

In one or more embodiments, the revealing elements and image elements on each side are separated from each other and are distributed so that the revealing elements on each side magnify a substantially fixed proportion of the image elements on the other side, irrespective of their relative phase or offset in two mutually orthogonal directions in the plane of the substrate.

In one or more embodiments, a plurality of the revealing elements form a sampling screen to sample a plurality of the image elements.

In one or more embodiments, the plurality of revealing elements are grid lines that form a parallax barrier to enable viewing of a stereoscopic, multiscopic, interlaced or integral or moiré image in the image elements.

In one or more embodiments, the plurality of revealing elements form a hexagonal or other geometric array light transmissive elements.

In one or more embodiments, the plurality of revealing elements is printed.

In one or more embodiments, the plurality of revealing elements are formed by embossing.

In one or more embodiments, a plurality of the revealing elements are lens elements that sample and magnify a plurality of the image elements.

In one or more embodiments, the lens elements are refractive and cause light to be focused on a focal point.

In one or more embodiments, the lens elements are diffractive and cause constructive interference of light at a focal point.

In one or more embodiments, the lens elements are coated with a transparent layer of material having a different refractive index from the lens elements.

In one or more embodiments, the lens elements are formed by embossing.

In one or more embodiments, the lens elements are applied as a foil.

In one or more embodiments, a plurality of the image elements are formed by printing.

In one or more embodiments, the plurality of the image elements are printed onto or underneath some of the revealing elements.

In one or more embodiments, the plurality of image elements are formed by embossing.

In one or more embodiments, the image elements are coated with a transparent layer of material having a different refractive index from the material in which the image elements are formed.

In one or more embodiments, the image elements are applied as a foil.

In one or more embodiments, the imagery structure and the revealing structure are integrated into a unitary structure.

In one or more embodiments, the imagery structure and the revealing structure are formed by separate embossing actions.

In one or more embodiments, the imagery structure and the revealing structure are formed by a single embossing action.

In one or more embodiments, the revealing structure is formed on top of or underneath a plurality of the image elements.

In one or more embodiments, the revealing structure is formed on top of a plurality of the image elements, and the imagery structure is formed in a shim and then transferred to the security device.

In one or more embodiments, the plurality of image elements lies within the depth of focus of the lens elements.

In one or more embodiments, the plurality of image elements on each side of the substrate is located in a single image plane.

In one or more embodiments, the plurality of image elements is recessed with respect to neighbouring lens elements.

In one or more embodiments, the plurality of image elements is raised with respect to neighbouring lens elements.

In one or more embodiments, the plurality of image elements has substantially the same height as one or more neighbouring lens elements.

In one or more embodiments, the plurality of image elements forms a flat pattern.

In one or more embodiments, the plurality of image elements forms a diffraction grating.

In one or more embodiments, the plurality of image elements forms a light diffusing or light extinguishing pattern.

In one or more embodiments, one or more of revealing elements and image elements are overprinted with coloured ink.

In one or more embodiments, the pitch of the lens elements on each side, and the orientation of the lens elements on one side relative to the lens elements on the other side, are selected so that either (i) the moiré magnified image of the perimeter edge of the lens is larger than the optical effect image on each side; or (ii) the moiré magnified image of the perimeter edge of the lens is smaller than what can be discerned by the naked eye.

In one or more embodiments, the moiré magnified image of the perimeter edge of the lens is less than 0.1 mm.

In one or more embodiments, the lens elements forming the first group of the second revealing elements are packed differently to the lens elements forming the first group of the first revealing elements.

In one or more embodiments, one or both of (i) the first group of the first revealing elements and the first group of the second image elements and (ii) the first group of the second revealing elements and the first group of the first image elements, are distributed within the first region so that lens elements on each side of the substrate magnify a substantially fixed proportion of the imagery on the other side of the substrate, irrespective of their relative phase or offset in two mutually orthogonal directions.

In one or more embodiments, the substantially fixed proportion is 25% and the two mutually orthogonal directions are the machine direction and cross direction in either a roll-to-roll process for applying lenses and/or imagery or a sheet fed process for applying lenses and/or imagery.

In one or more embodiments, the lens and imagery regions on each side consist of strips of lens regions interleaved with strips of image regions, wherein the strips on one side are not parallel to the strips on the other side.

In one or more embodiments, if rectangular packed lenses are used on both sides, the interleaved strips on one side are orthogonal to the interleaved strips on the other side.

In one or more embodiments, if hexagonal packed lenses are used on both sides, the interleaved stripes on one side are rotated 60 degrees relative to the interleaved strips on the other side.

In one or more embodiments, if cylindrical lenses are used on both sides, the interleaved stripes on one side are orthogonal to the interleaved strips on the other side.

In one or more embodiments, if cylindrical lenses are used on both sides, the cylindrical axis on one side is orthogonal to the cylindrical axis on the other side.

Definitions

Security Document or Token

As used herein, the terms security documents and tokens includes all types of documents and tokens of value and identification documents including, but not limited to the following: items of currency such as bank notes and coins, credit cards, cheques, passports, identity cards, securities and share certificates, driver's licences, deeds of title, travel documents such as airline and train tickets, entrance cards and tickets, birth, death and marriage certificates, and academic transcripts.

The invention is particularly, but not exclusively, applicable to security devices, for authenticating items, documents or tokens, such as bank notes, or identification documents, such as Identity cards or passports, formed from a substrate to which one or more layers of printing are applied.

More broadly, the invention is applicable to a micro-optic device which, in various embodiments, is suitable for visual enhancement of clothing, skin products, documents, printed matter, manufactured goods, merchandising systems, packaging, point of purchase displays, publications, advertising devices, sporting goods, security documents and tokens, financial documents and transaction cards, and other goods.

Security Device or Feature

As used herein, the term security device or feature includes any one of a large number of security devices, elements or features intending to protect security document or token from counterfeiting, copying, alteration or tampering. Security devices or features may be provided in or on the substrate of the security document or in or on one or more layers applied to the base substrate, and may take a wide variety of forms such as security threads embedded in layers of the security document; security inks such as fluorescent, luminescent or phosphorescent inks, metallic inks, iridescent inks, photochromic, thermochromic, hydrochromic, or peizochromic inks; printed or embossed features including release structures; interference layers; liquid crystal devices; lenses and lenticular structures; optically variable devices (OVDs) such as diffractive devices including diffraction gradients, holograms and diffractive optical elements (DOEs).

Substrate

As used herein, the term substrate refers to the base material from which the security document or token is formed. The base material may be paper or other fibrous materials such as cellulous; a plastic or polymeric material including but not limited to polypropylene (PP), polyethylene (PE), polycarbonate (PC), polyvinyl chloride (PVC), polyethylene terephthalate (PET), biaxially-oriented polypropylene (BOPP); or a composite material of two or more materials, such as a laminate of paper and at least one plastic material, or of two or more polymeric materials.

Transparent Windows and Half Windows

As used herein, the term window refers to a transparent or translucent area in the security document compared to the opaque region to which printing is applied. The window maybe fully transparent so as to allow the transmission of light substantially unaffected, or it may be partly transparent or translucent, partly allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting at least one opacifying layer in the region forming the window area. If opacifying layers are applied to both sides of a transparent substrate, a fully transparent window may be formed by omitting the opacifying layers on both sides of the transparent substrate in the window area.

A partly transparent or translucent area herein after referred to as a "half-window", may be formed in a polymeric security document which has opacifying layers on both sides by omitting the opacifying layers on one side only of the security document in the window area so that "half-window" is not fully transparent but allows sunlight to pass through without allowing objects to be viewed clearly through the half-window.

Alternatively, it is possible for the substrates to be formed from a substantially opaque material, such as paper or fibrous material, without an insert of transparent plastics material inserted into a cut out or recessed into the paper or fibrous substrate to form a transparent window or a translucent half-window area.

Opacifying Layers

One or more opacifying layers may be applied to a transparent substrate to increase the opacity of the security document. An opacifying layer is such that $L_T < L_0$ where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Revealing Elements

One or more revealing elements may be applied to the substrate of the security device. As used herein, the term "revealing element" refers to elements and devices that focus light towards or cause light to constructively interfere at a real focal point, or devices placed in front of an image source to selectively reveal different portions of the image source. Revealing elements include refractive elements that focus incoming light to a real focal point in a real focal plane and also collimate light scattered from any point in the focal plane to a particular direction. Revealing elements also include transmissive diffractive lenses, zone plates and the like that cause transmitted diffracted light to constructively interfere at a desired real focal point.

Revealing elements also include a sampling screen or parallax barrier to show a stereoscopic image or multiscopic image to a user. When placed on one side of a transparent substrate, a sampling screen or parallax barrier consists of a layer of material with a series of precision slits, allowing each eye to see a different section of the image elements on the other side of the substrate, so creating a sense of depth through parallax in an effect similar to that created by lenticular lenses.

BRIEF DESCRIPTION OF DRAWINGS

Preferred embodiments of the invention will now be described by way of example only with reference to the accompanying drawings in which:

FIG. 32 is a ray trace model of a lens element forming part of one or more embodiments of a micro-optic device according to the present invention;

FIGS. 33 and 34 are two exemplary image element designs for use in one or more embodiments of a micro-optic device according to the present invention.

DETAILED DESCRIPTION OF DRAWINGS

Figure 1:
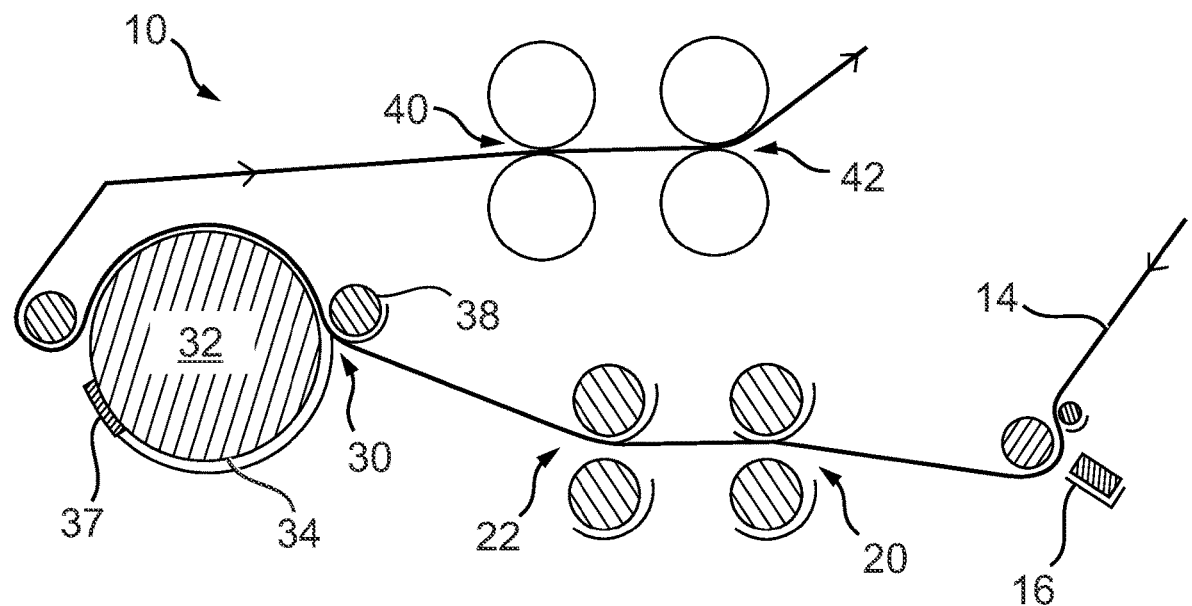
FIG. 1 is a schematic diagram of one embodiment of an apparatus for in-line manufacturing part of security document.
Figure 2:
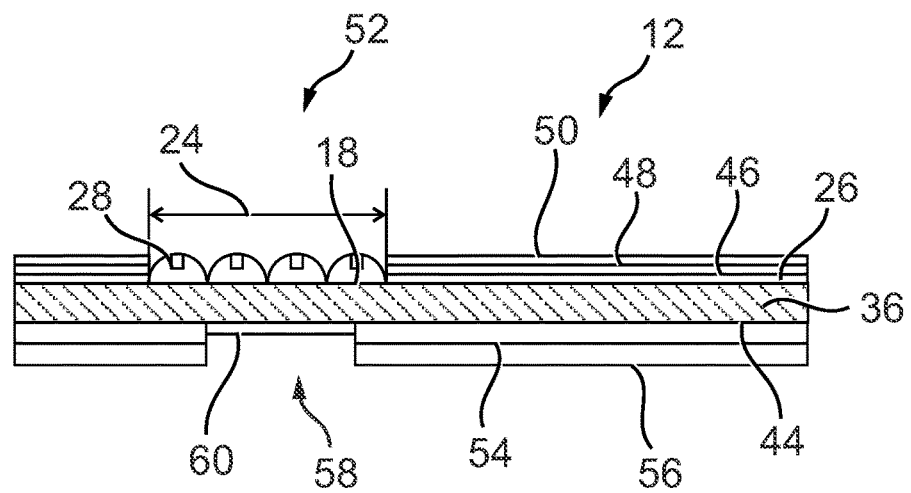
FIG. 2 is a cutaway side view of the partially manufactured security document manufactured by the apparatus of FIG. 1.
Figure 3:
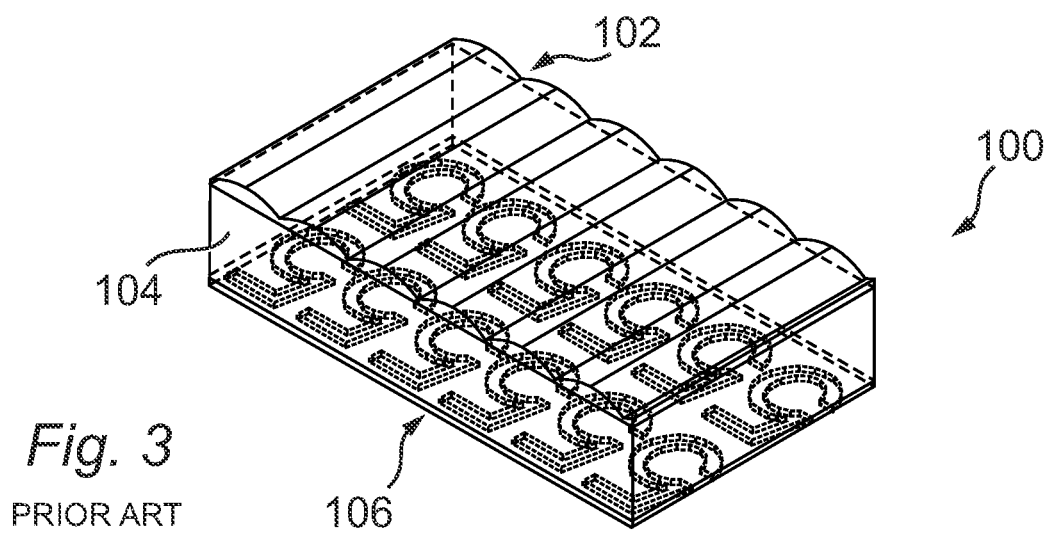
FIGS. 3 to 5 are isometric views of a first embodiment of a prior-art micro-optic device forming part of the security document shown in FIG. 2.
Figure 4:
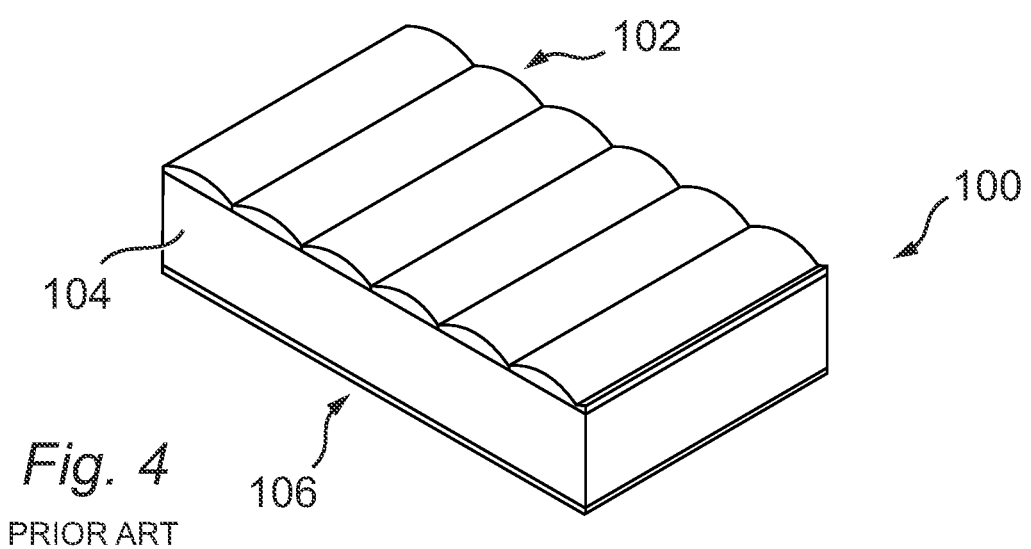
Figure 5:
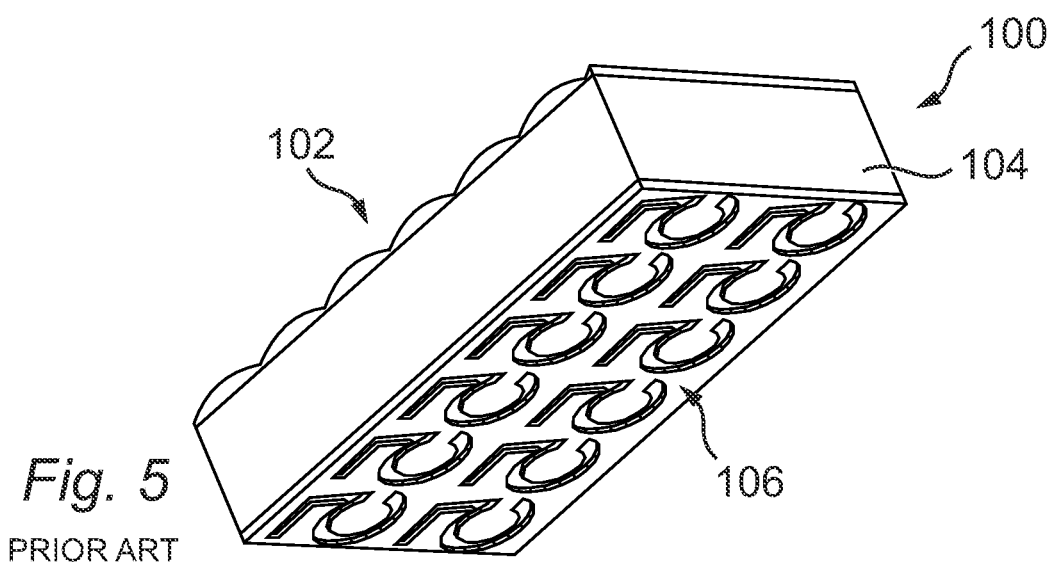

FIG. 1 shows an exemplary apparatus 10 for in-line manufacturing part of an exemplary document 12 depicted in FIG. 2. A continuous web 14 of translucent or transparent material such as polypropylene or PET is subject to an adhesion promoting process at a first processing station 16 including a roller assembly. Suitable adhesion promoting processes are flame treatment, corona discharge treatment, plasma treatment or similar.

An adhesion promoting layer 18 is applied at a second processing station 20 including a roller assembly. A suitable adhesion promoting layer is one specifically adapted for the promotion of an adhesion of UV-curable coatings to polymeric surfaces. The adhesion promoting layer may have a UV curing layer, a solvent-based layer, a water-based layer or any combination of these.

At a third processing station 22 which also includes a roller assembly, the radiation sensitive coating is applied to the surface of the adhesion promoting layer 18. The radiation sensitive coating can be applied via flexographic printing, gravure printing or a silk screen printing process and variations thereof amongst other printing processes.

The radiation sensitive coating is only applied to the security element area 24 on a first surface 26 where a unitary structure 28 including a periodic array of lens elements and/or a periodic array of image elements is to be positioned. The security element area 24 can take the form of a stripe, a discrete patch in the form of simple geometric shape or in the form of a more complex graphical design.

While the radiation sensitive coating is still, at least partially, liquid, it is processed to form the unitary structure 28 at a fourth processing station 30. In one embodiment, the processing station 30 includes an embossing roller 32 for embossing a security element structure, such as the unitary structure 28 into a radiation sensitive coating in the form of a UV-curable ink. The cylindrical embossing surface 34 has surface relief formations corresponding to the shape of the unitary structure 28 to be formed. In one embodiment, the surface relief formations can orient the array of lens elements and/or the array of image elements in the machine direction, transverse to the machine direction, or in multiple directions at an angle to the machine direction. The apparatus 10 can form micro lenses and micro-imagery elements in a variety of shapes.

The cylindrical embossing surface 34 of the embossing roller 32 may have a repeating pattern of surface relief formations or the relief structure formations may be localized to individual shapes corresponding to the shape of the security elements area 24 on the substrate 36. The embossing roller 32 may have the surface relief formations formed by a diamond stylus of appropriate cross section, or by direct laser engraving, or by chemical etching, or the surface relief formations may be provided by at least one embossing shim 37 provided on the embossing roller 32. The at least one embossing shim may be attached via adhesive tape, magnetic tape, clamps or other appropriate mounting techniques.

The UV-curable ink on the substrate is brought into intimate contact with the cylindrical embossing surface 34 of the embossing roller 32 by a UV roller 38 at processing station 30 such that the liquid UV-curable ink flows into the surface relief formations of the cylindrical embossing surface 34. At this stage, the UV-curable ink is exposed to UV radiation, for example, by transmission through the substrate layer 36.

With the security element structure 28 applied to the document substrate 36, one or more additional layers are applied at a downstream processing station including further roller assemblies 40 and 42. The additional layers may be clear or pigmented coatings and applied as partial coating, as a contiguous coating or accommodation of both. In one preferred method, the additional layers are opacifying layers which are applied to one or both surfaces of the substrate 36 except in the region of the security element structure.

FIG. 2 shows a partially manufactured security document formed with an embossed security element structure 28 in the form of a unitary structure having an array of lens elements and/or an array of image elements. These security documents comprise a transparent substrate of polymeric material, preferably an axially orientated polypropylene (BOPP) having a first surface 26 and a second surface 44. Opacifying layers 46, 48 and 50 are applied to the first surface 26, except a window area 52 where the security element structure 28 is applied to the first surface 26.

Opacifying layers 54 and 56 are applied to the second surface 44 except in a window area 58. The window area 58 substantially coincides with the window area 52 on the first surface 26. A printed layer 60 may be applied to the second surface 44 on the opposite side of the substrate in the window area 58.

FIGS. 3 to 6 show a conventional security device 100, manufactured according to the process described and depicted in relation to FIGS. 1 and 2. The security device includes an array of micro lenses applied to one side of a polymer bank note and a corresponding layer of image elements applied to the other side of the bank note. Typically, the lens elements are embossed by the process described in relation to FIGS. 1 and 2. Typically, the image elements are printed and/or embossed in a separate process.

Figure 6:
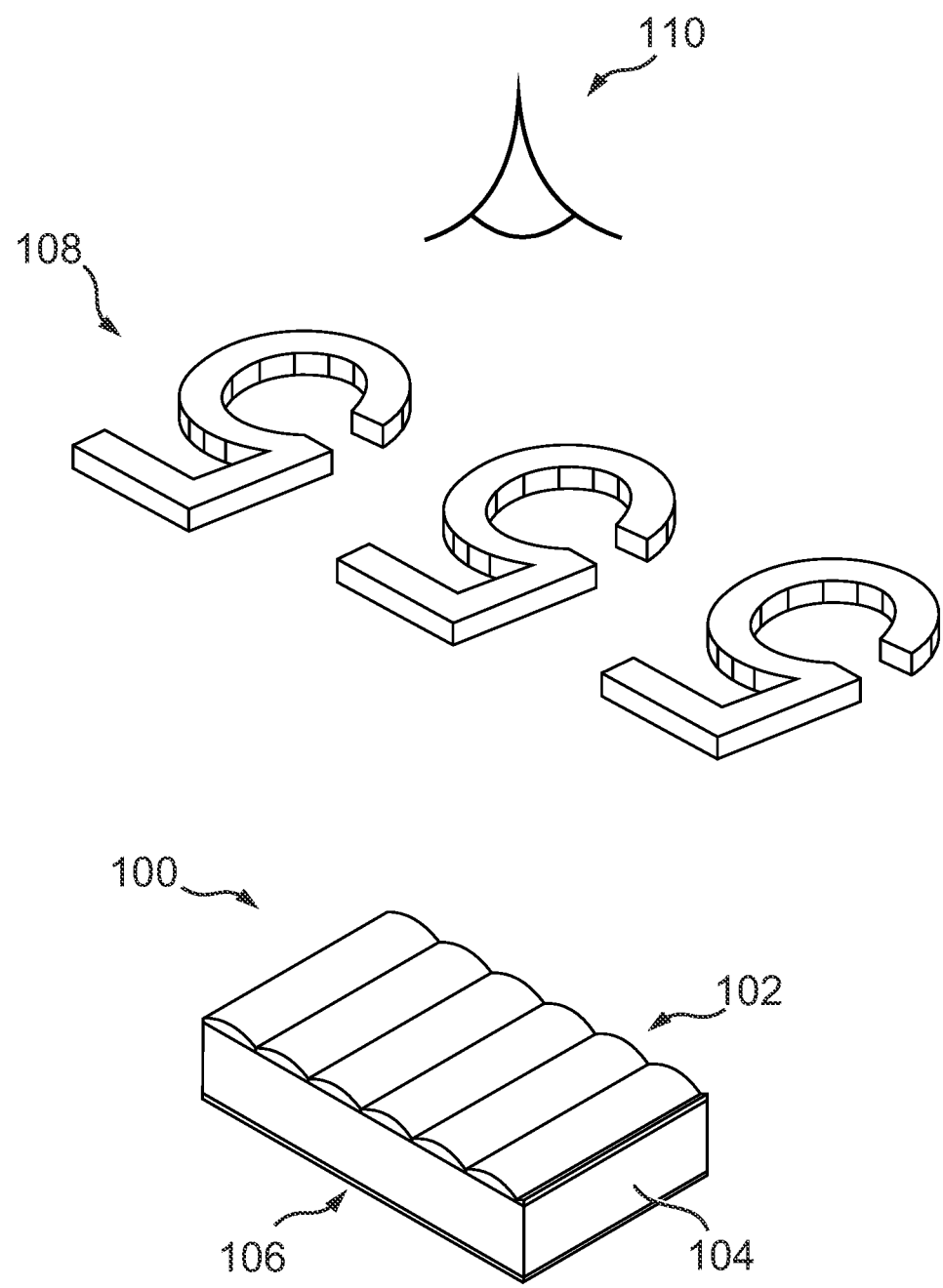
FIG. 6 shows an isometric view of the micro-optic device shown in FIGS. 3 to 5 as well as a moiré magnified image produced by that micro-optic device.
Figure 7:
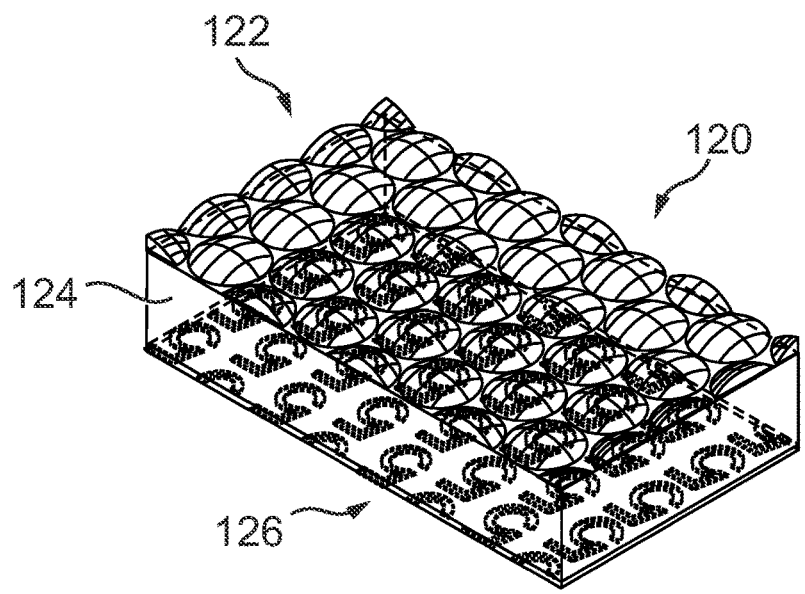
FIGS. 7 to 9 are isometric views of a second embodiment of a prior-art micro-optic device forming part of the security document shown in FIG. 2.
Figure 8:
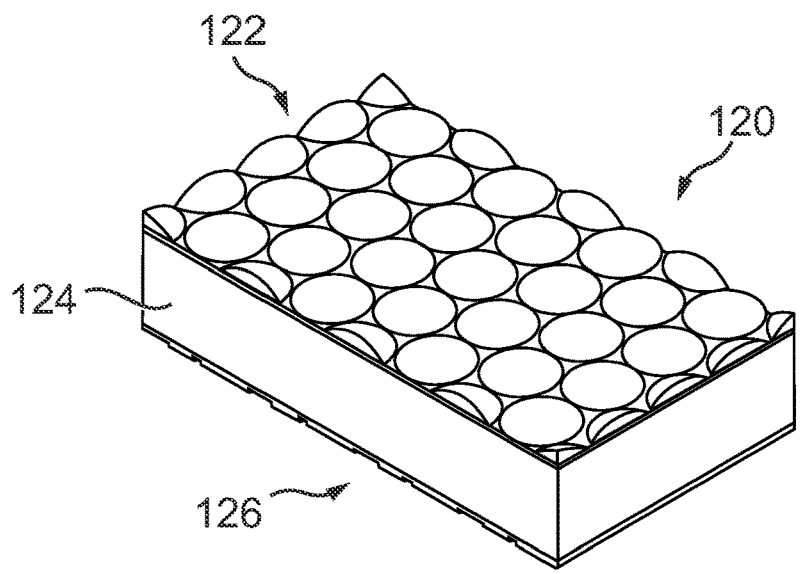
Figure 9:
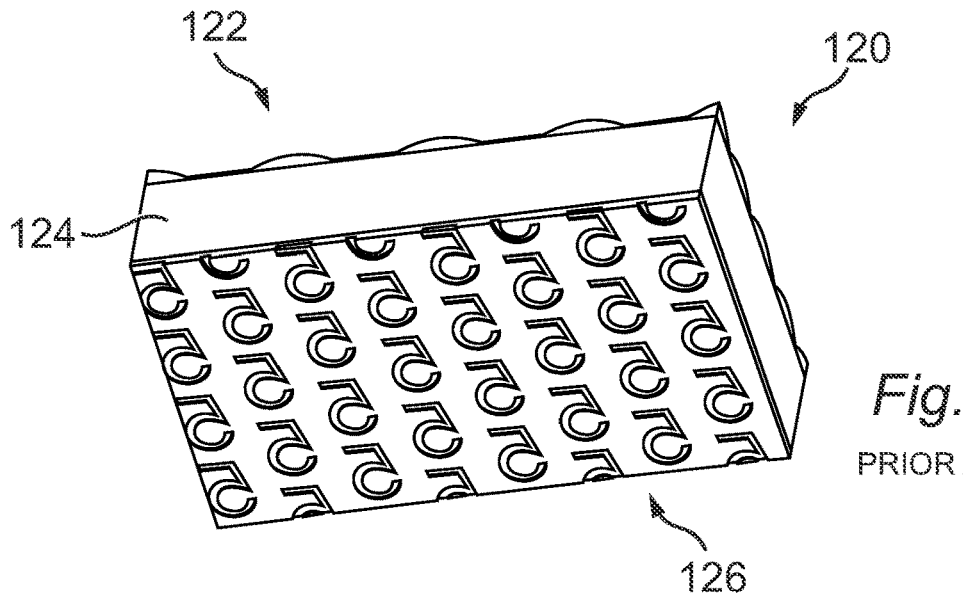
Figure 10:
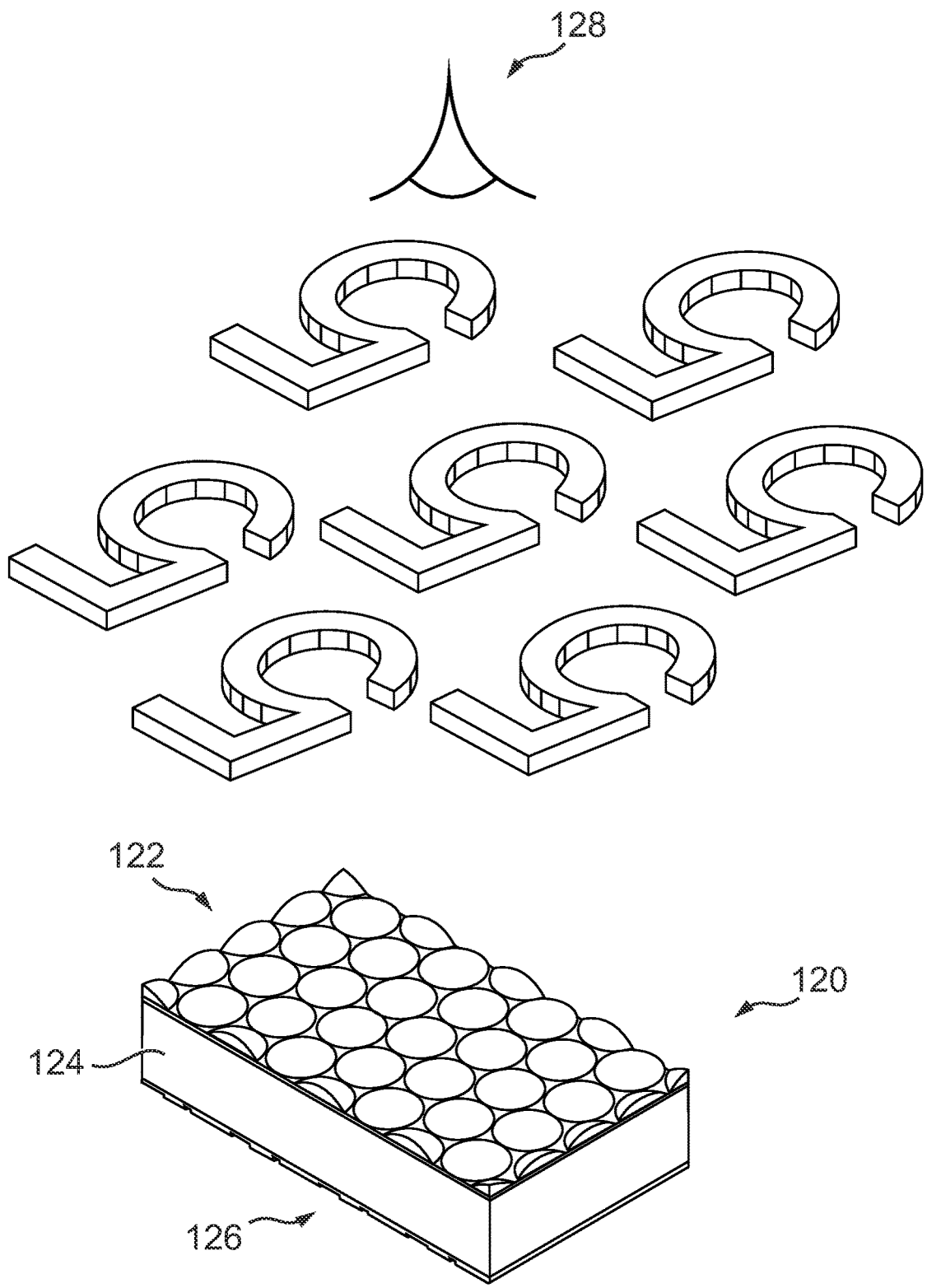
FIG. 10 shows an isometric view of the micro-optic device shown in FIGS. 7 to 9 as well as a moiré magnified image produced by that security device.

In this example, the security device 100 includes an array 102 of micro lens elements applied to one side of a substrate 104 and corresponding image elements 106 applied to the other side of the substrate 104. Typically, the lens elements are embossed. The image elements can be printed and/or embossed. In this example, the lens elements 102 are cylindrical lens elements and have a pitch of 63.5 microns. The imagery produced for observation by a user is a magnified moiré type design, and the image elements consist of an array of "icons" of the numeral "5", the icons having a slightly different pitch to the lens elements so that the lenses will project a moiré-magnified image or images 108 of the numeral "5" that is observed by a user 110 (FIG. 6).

The value of pitch used for the icons will determine the magnification factor of the moiré-magnified image 108 of the numeral "5". The value of pitch used for the icons will also determine the 3D depth perceived in the moiré-magnified image of the numeral "5". The icon pitch can be selected so that the moiré magnified image can be appear to either float in front of the bank note or behind it. The moiré-magnified image can only be observed by viewing the feature from the lens side of the substrate 104. If viewing the feature from the image element side, the icon array can be observed. However because the icons are so small, they cannot be discerned by the naked eye. This means that the reverse side of the security device does not produce any optical effects that are discernible by the user and the appearance of the security device on that side can be easily simulated with a conventional printed design. Moreover, if the reverse side of the security feature is overprinted, the overprinting will be visible from the lens element side, which means that the optical effects can be compromised (i.e. reduced contrast, less overt appearance) making it less effective for authentication.

FIGS. 7 to 10 similarly show a conventional polymer bank note micro lens security device 120 including hexagonal packed micro lens elements 122 applied to one side of a substrate 124 and a corresponding hexagonal packed array 126 of image elements applied to the reverse side. Typically, the lens elements are embossed. Typically, the image elements can be overprinted and/or embossed. The image elements on the reverse side of the substrate similarly form a "dead" area on the bank note, which usually cannot be overprinted with typical bank note artwork, without reducing the authenticating effectiveness of the magnified image elements seen from the lens side of the feature by a user 128. The "dead" area containing the image elements is therefore difficult to integrate with the rest of the bank note design on the imagery side of the bank note.

In the context of the present invention, the term "packed" is intended to refer to a recurring geometric pattern in which image elements and/or lens elements are arranged.

In one or more embodiments of the invention, revealing elements such as lens elements, are applied on both sides of a transparent substrate and image elements are also applied to both sides of the substrate so that the revealing elements on the first side of the substrate act to reveal image elements on a second side of the substrate and revealing elements on a second side of the substrate act to reveal image elements on the first side of the substrate. Preferably, the revealing elements and image elements on each side occupy a same region of the security device.

Figure 11:
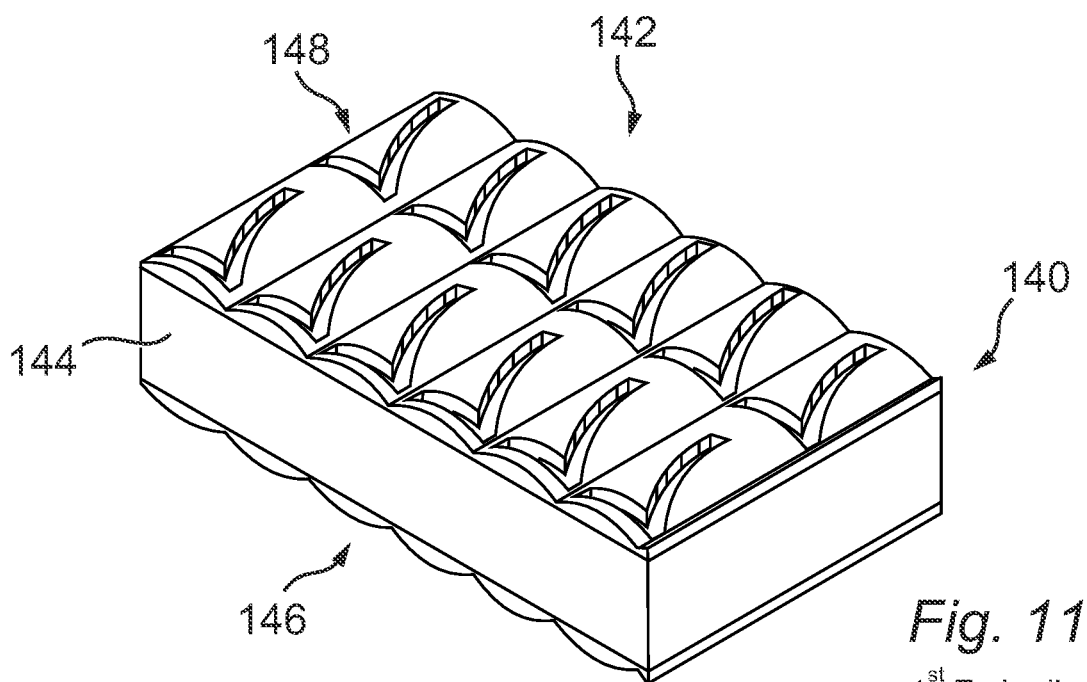
FIGS. 11 and 12 are respectively isometric top and bottom views of a first embodiment of a micro-optic device according to the present invention.
Figure 12:
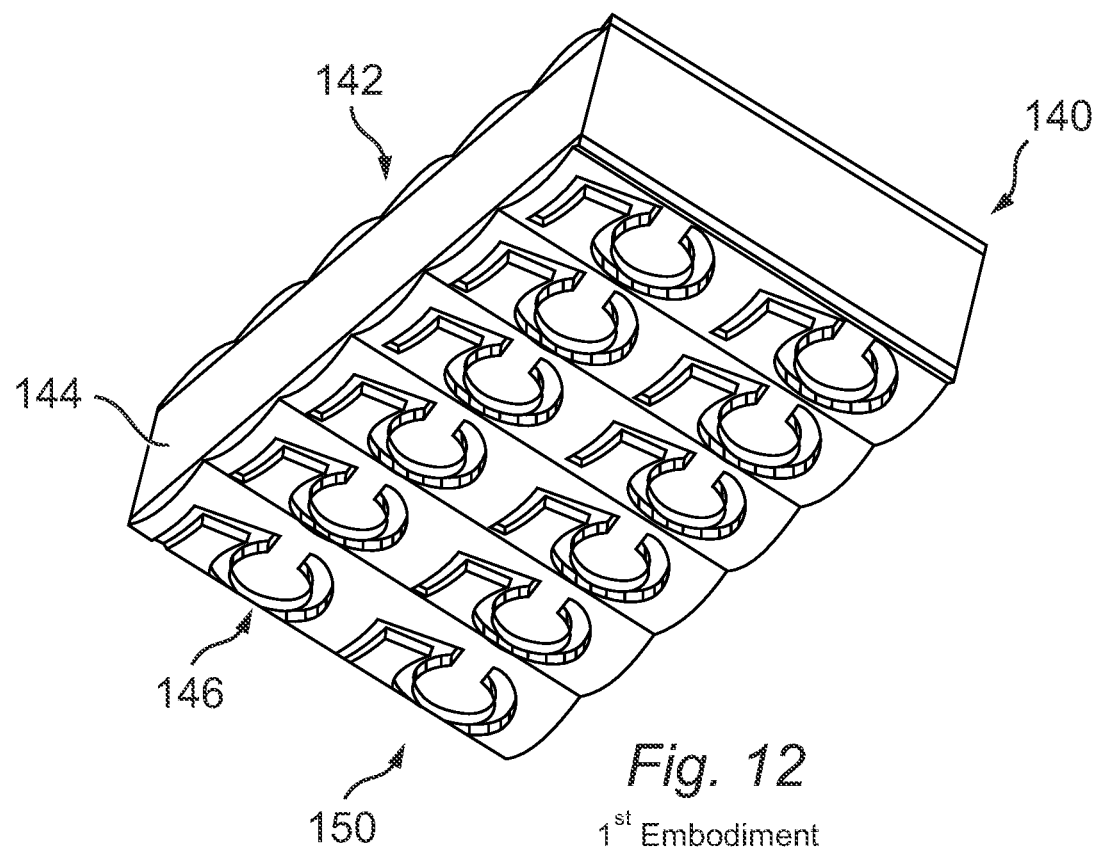
Figure 13:
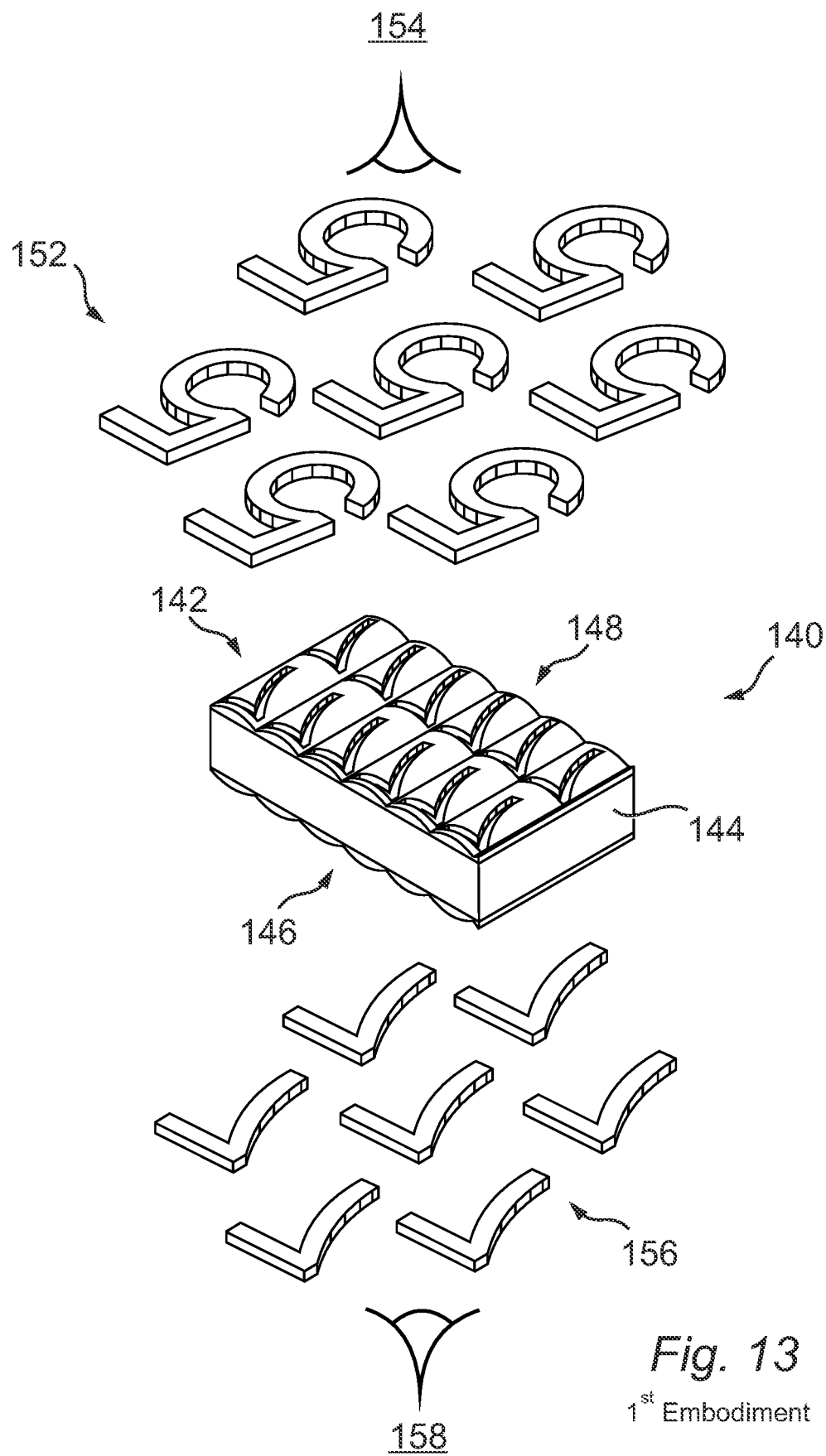
FIG. 13 shows an isometric view of the micro-optic device shown in FIGS. 11 and 12 as well as two moiré magnified images produced by that micro-optic device.

FIGS. 11 to 13 depict one exemplary embodiment of a security device 140 in which an array 142 of cylindrical lenticular lens elements are applied to a first side of a substrate 144 and an array 146 are also applied to the other side of the substrate 144.

An array 148 of image elements in the form of "icons" of the numeral "7", are applied to the array 142 of lens elements. Similarly, an array 150 of image elements in this case having the form of "icon" of the numeral "5" is applied to the array 146 of lens elements. In this example, the arrays 142 and 146 of lens elements are applied to the substrate 144 by embossing whilst the arrays 148 and 150 of image elements can be either printed on the lens elements or can also be applied by embossing. In embodiments where both the lens elements and image elements are embossed, a separate embossing step can be used to emboss the lens elements and the image elements or alternatively a single unitary structure including a lens structure of lens elements and an imagery structure of image elements can be embossed in a single step.

The image elements on each side of the security device 140 lie within the depth of focus of the lens elements on the other side of the security device 140. In this arrangement, a moiré-magnified image is observed form both sides of the substrate 144. Magnified images 152 of the icon "5" appear to float above the bank note from the one side whereas magnified images 156 of the icon "7" appear to float above the bank note when viewed from the other side 158 of the bank note.

Figure 14:
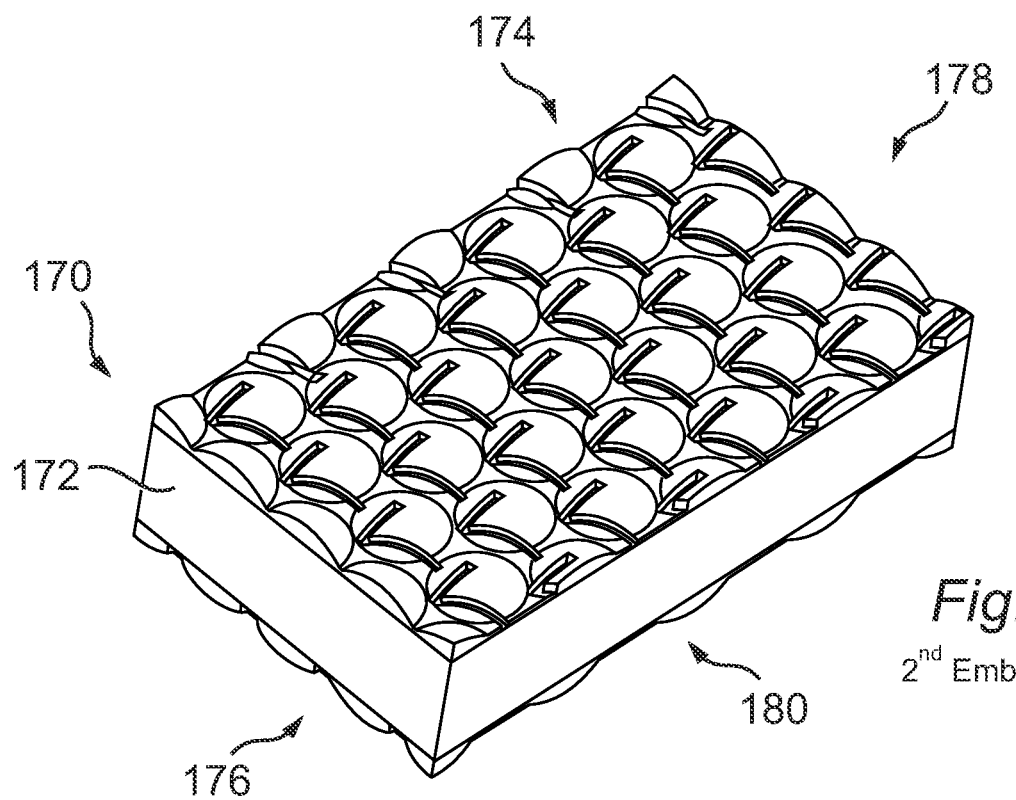
FIGS. 14 and 15 are respectively isometric top and bottom views of a second embodiment of a micro-optic device according to the present invention.
Figure 15:
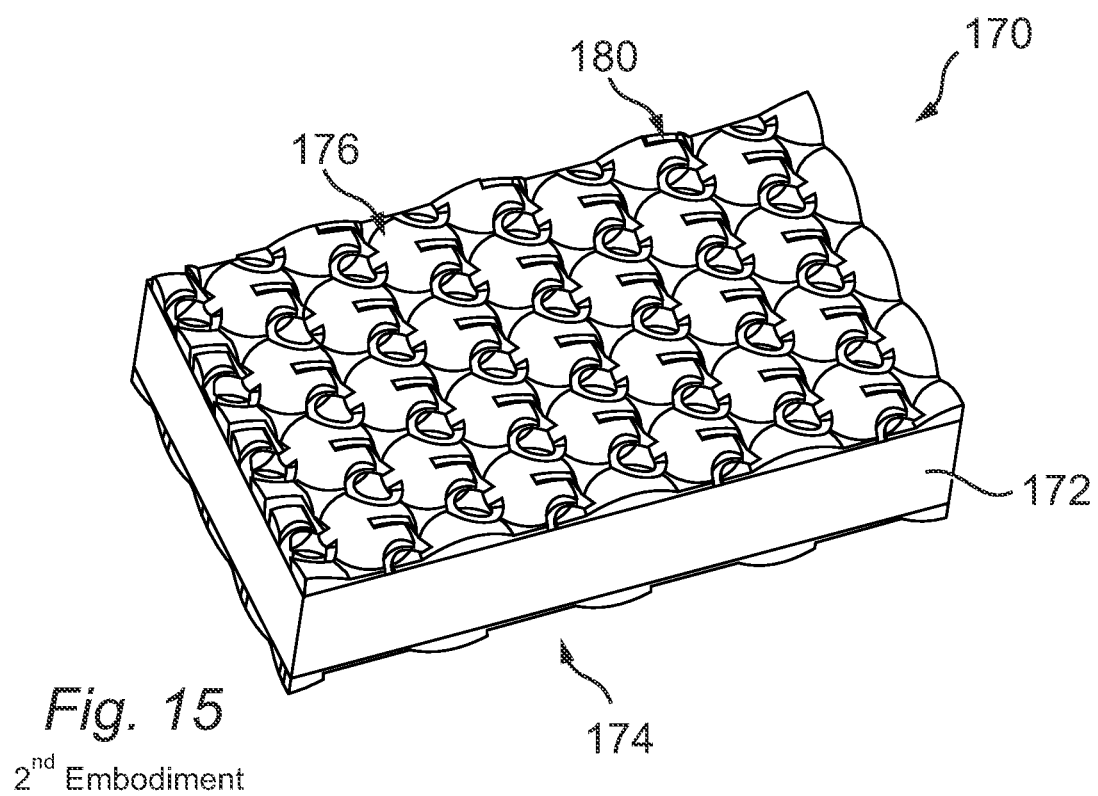
Figure 16:
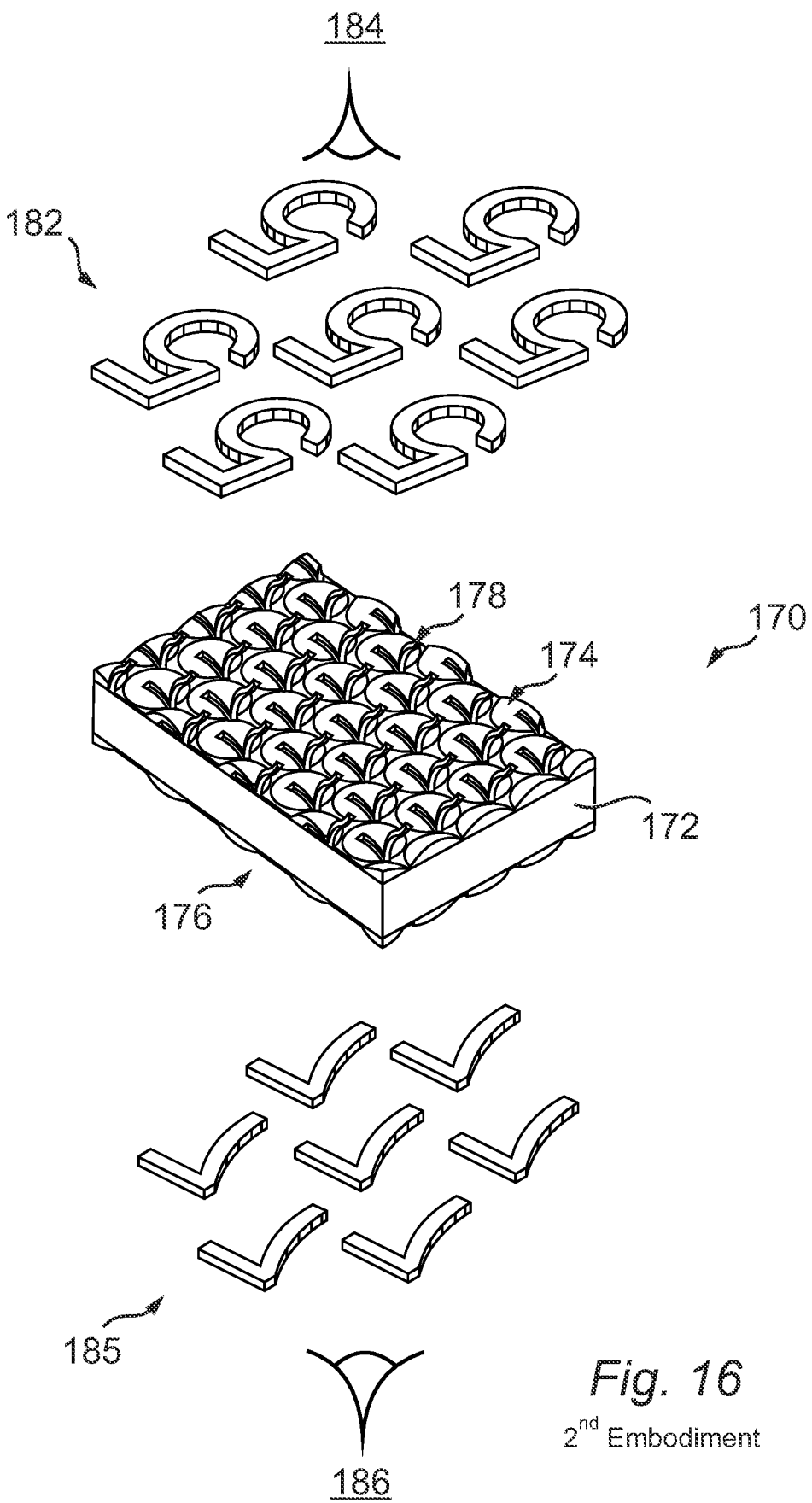
FIG. 16 shows an isometric view of the micro-optic device shown in FIGS. 14 and 15 as well as two moiré magnified images produced by that micro-optic device.

FIGS. 14 to 16 depict a different embodiment using hexagonal packed lenses applied to both sides of the substrate. In this embodiment, the security device 170 includes a transparent substrate 172, an array 174 of hexagonal packed circular lens elements on a first side of the substrate and an array 176 of hexagonal packed circular lens elements on the other side of the substrate 172. An array 178 of image elements is applied to the array 174 of lens elements, whereas an array 180 of image elements is applied to the array 176 of lens elements on the other side of the substrate. The array 174 of lens elements acts to sample and magnify the array 180 of image elements on the other side of the substrate, whereas the array 176 of lens elements acts to sample and magnify the array 178 of image elements applied to the array 174 of lens elements.

In this embodiment, moiré-magnified images are observed from both sides of the substrate. Magnified images 182 of the icon "5" appear to float above the bank note when viewed from one side 184 of the security device, whereas magnified images 185 of the icon "7" appear to float above the bank note when viewed from the other side 186 of the security device.

Once again, the image elements can be printed or embossed on the respective arrays of lens elements. When the image elements are embossed, this can occur either simultaneously with embossing of the lens elements or as a separate step.

It will be appreciated that the lenticular lens elements depicted in FIGS. 11 to 13 and the hexagonal packed circular lens elements depicted in FIGS. 14 to 18 are merely two examples of suitable revealing elements. In other embodiments of the invention, the revealing elements can include a parallax barrier or sampling screen that may be printed or embossed on one or both sides of the substrate to allow the viewer from that side of the substrate to observe a stereoscopic image or multiscopic image or integral image or interlaced image or moiré magnified image by selectively revealing portions of the array of image elements on the other side of the substrate. When the revealing elements are lens elements, a number of different profiles may be used depending upon the application including circular, elliptical, parabolic and conical. The lens elements may have a profile as described above in the first direction and as shown in FIGS. 11 to 13, extend in the second direction to form a cylinder. Alternatively, the profile of the focusing element may be revolved about an axis extending perpendicularly to the surface of the substrate as is the case in the embodiment depicted in FIGS. 14 to 16.

The two embodiments depicted in FIGS. 11 to 16 involve refractive lens elements however other suitable revealing elements include Fresnel lens elements. Other suitable revealing elements include diffractive lens elements and diffractive zone plate elements that cause constructive interference of light at or proximate the image elements on the other side of the substrate.

Preferably when the lens elements are diffractive, they are coated with a transparent layer of material having a different refractive index from the lens elements in order to prevent mechanical copying of the lens elements via electroforming, and to prevent ingress of liquids such as sweat and dirt that would otherwise extinguish or reduce the revealing effect of the lens elements.

In addition to application by embossing, the lens elements or image elements or a unitary structure incorporating both lens and image elements may also be applied to the substrate by printing or as a foil.

As mentioned, a plurality of the revealing elements may form a sampling screen to sample a plurality of the image elements on the other side of the substrate. In this case, the plurality of revealing elements may be grid lines that form a parallax barrier to enable the viewing of a stereoscopic or multiscopic or integral or interlaced or moiré magnified image from the image elements.

The revealing elements may be packed in any convenient manner, so that they form a hexagonal or other geometric array of light transmissive, refractive or diffractive elements.

The revealing elements when in the form of a sampling screen may be packed in any convenient manner, so that they form a hexagonal or other geometric array of light transmissive elements.

Figure 17:
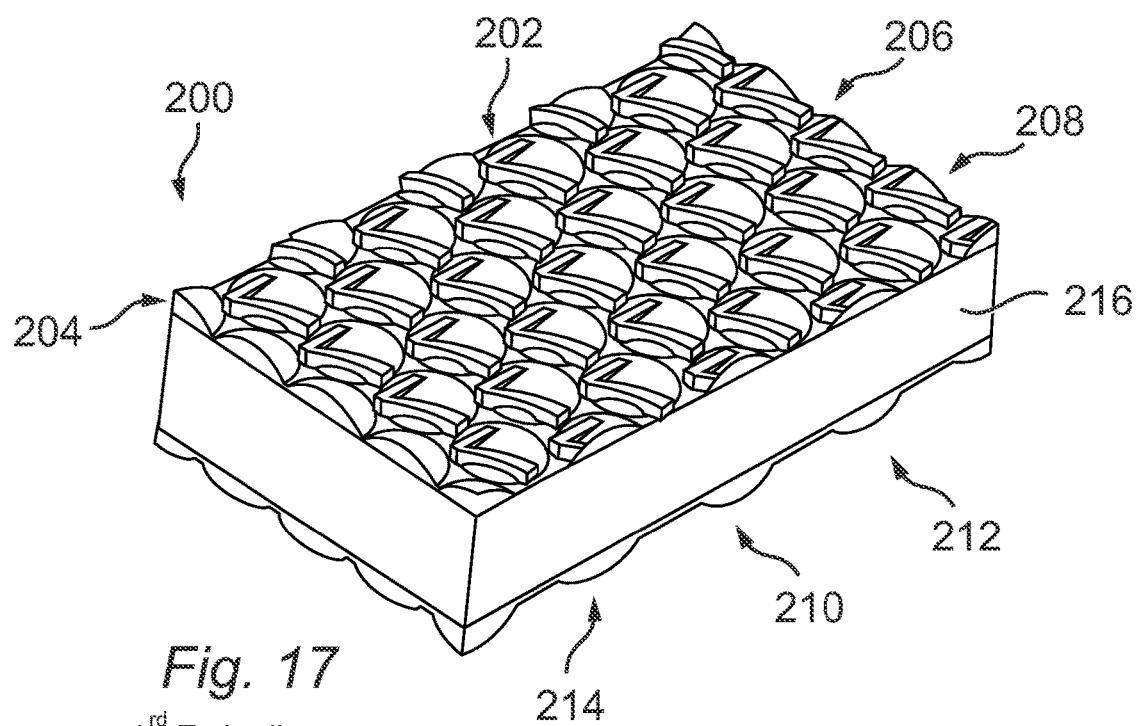
FIGS. 17 and 18 are respectively isometric top view of a third embodiment of a micro-optic device, and a zoomed in view of part of that micro-optic device, according to the present invention.
Figure 18:
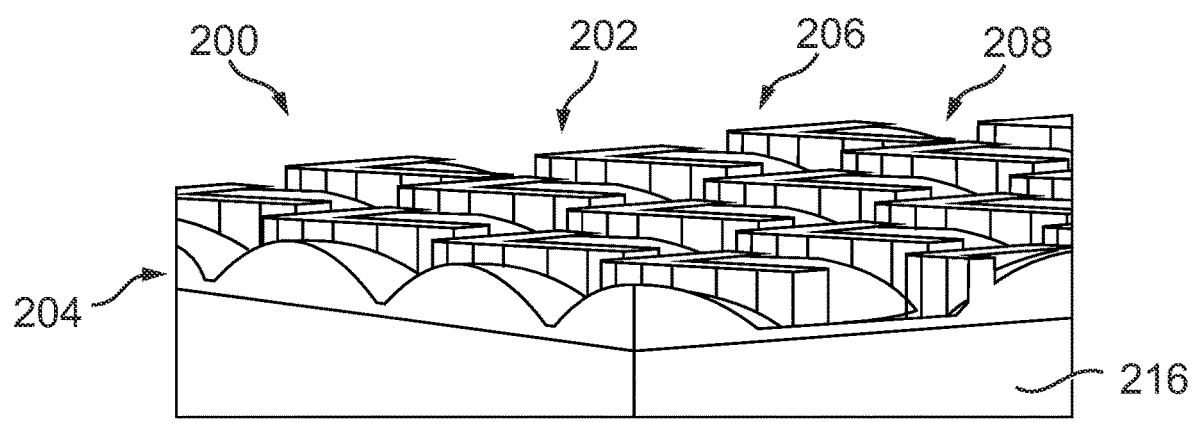

Conveniently, the imagery structure will locate the image elements on one side of the substrate substantially in a single image plane, as is the case in the embodiment depicted in FIGS. 17 and 18. As can be seen from these figures, a unitary structure including a lens structure of lens elements and an imagery structure of image elements is applied to both sides of a transparent substrate. The security device 200 depicted in FIGS. 17 and 18 includes a unitary structure 202 including a lens structure 204 including a hexagonal packed array of circular refractive lens elements integrated with an imagery structure 206 including an array 208 of "icons" in the form of the reference "7". A similar unitary structure 210 including a lens structure 212 including an array of lens elements 214 and an imagery structure (not shown) including an array of image elements is applied to the other side of the substrate 216.

It can be seen, particularly from FIG. 18, that the imagery structure 206 locates the image elements in a single plane, and that by appropriate design of the depth of the transparent substrate 216 and the lens elements 214 on the other side of the substrate, the image elements 208 can be placed within the focal depth of the lens elements 214 on the other side of the substrate.

By contrast, it can be seen from the embodiments depicted in FIGS. 11 to 16, the image elements in these examples do not lie precisely in a horizontal image plane but rather occupy a depth or have a shape corresponding the sag of the lenses to which they are applied or otherwise integrated to. Depending on the lenses used on the other side of the imagery, this can result in blurry optical effects although the blurriness can be reduced or eliminated by using lenses which have a focal depth that substantially encompasses the depth of the imagery structures.

The ray trace model 220 shown in FIG. 32 characterises an exemplary lens element having a lens width/pitch of 54 microns, a lens sag of 10.8 microns, a nominal focal depth of 104 microns and an effective focal depth of 8 microns. Provided the imagery structures located on the other side of the substrate are located 96 to 104 microns from the lens vertex, sharp optical effect images will be generated to a user.

In the exemplary embodiment depicted in FIGS. 17 and 18, it can be seen that the imagery structure acts to raise the image elements with respect to the surrounding lenses. In other embodiments of the invention where the imagery structure is embossed, the image elements may be positioned at the same height as the surrounding lens elements, recessed with respect to the surrounding lens elements or as a flat pattern. Moreover if the image elements are embossed, they may be embossed as a pattern of diffractive gratings, a light diffusing pattern or any other suitable structure that may be required in order to generate an optical effect observable to a user through the lens elements on the other side of the security device.

In the embodiments depicted in FIGS. 11 to 18, the image elements and the lens elements on each side of the substrate occupy the same region of the security device and therefore the contrast of the projected images observable to a user, will be reduced depending on the proportion of the region that is occupied by the lenses or sampling elements and the proportion that is occupied by the corresponding image elements. For this reason, the imagery design chosen is important and designs that occupy a smaller proportion of the area for each lens element, will produce brighter dual-sided images compared to designs which occupy a larger proportion of the area of each lens element.

FIGS. 33 and 34 respectively depict image element designs 222 and 224 that are each located inside one round lens element. It can be seen that the image element 222 occupies a smaller proportion of the area within one lens element than the image element 224, the lens element with image element 222 therefore projecting a higher contrast moiré-magnified image.

Care should be taken to ensure that the lens elements on each side of the substrate do not moiré-magnify the lens elements on the opposite side. The perimeter edge of the lens elements particularly if they are refractive have a contrast and if the perimeter edge is magnified, the clarity of the moiré magnified images would be reduced. This problem can be alleviated by designing the lens elements on one side of the substrate to have substantially the same pitch as the lens elements on the other side of the substrate. This will produce a moiré-magnified image of the lens element (including its perimeter edge) that will be much larger than the area of the security feature itself. Depending on the user's viewing angle and the relative phase of the lens elements on each side of the bank note, the magnified image of the lens element (including its perimeter edge) will be invisible at one viewing angle, meaning that it will not interfere with the optical effect images. For example, in one or more embodiments lenses with a pitch equal to 63.5 microns can be used on both sides of the security device.

Alternatively, moiré-magnification of the lens elements can be avoided by choosing a lens pitch on one side that is substantially different from the lens pitch on the other side. This will produce a moiré pattern of lens elements that are so small that they cannot be discerned with the naked eye. The lens elements (including their perimeter edges) would manifest as a uniform background grey level and consequently they would slightly reduce the contrast of the optical effect images. For example in one or more embodiments, lenses with a pitch equal to 63.5 microns can be used on one side of the security device and lenses with 51.0 microns pitch can be used on the other side. This arrangement would produce moiré bands with a period equal to 63.5×51.0/(63.5−51.0) equals 259 microns. Such bands would be very small and difficult to discern with the naked eye and would manifest as a faint background grey level in the optical effect images. In this example, the focal length of the lenses may optionally be adjusted (for example, by selecting suitable refractive indices for the material in which the lenses are embossed) to ensure that the lenses on each side are sufficiently focused on the image elements on the opposite side of the bank note.

The aforementioned comments in relation to the pitch of the lenses on both sides of the security device, also apply to the skew and the refractive indices of the lenses on opposing sides of the transparent substrate. In other words, it is possible to use lenses on one side of the security device which have either substantially the same or a markedly different pitch, skew or refractive index from the lenses on the other side so that the magnified moiré images of the lens elements are reduced, minimized or eliminated.

Figure 19:
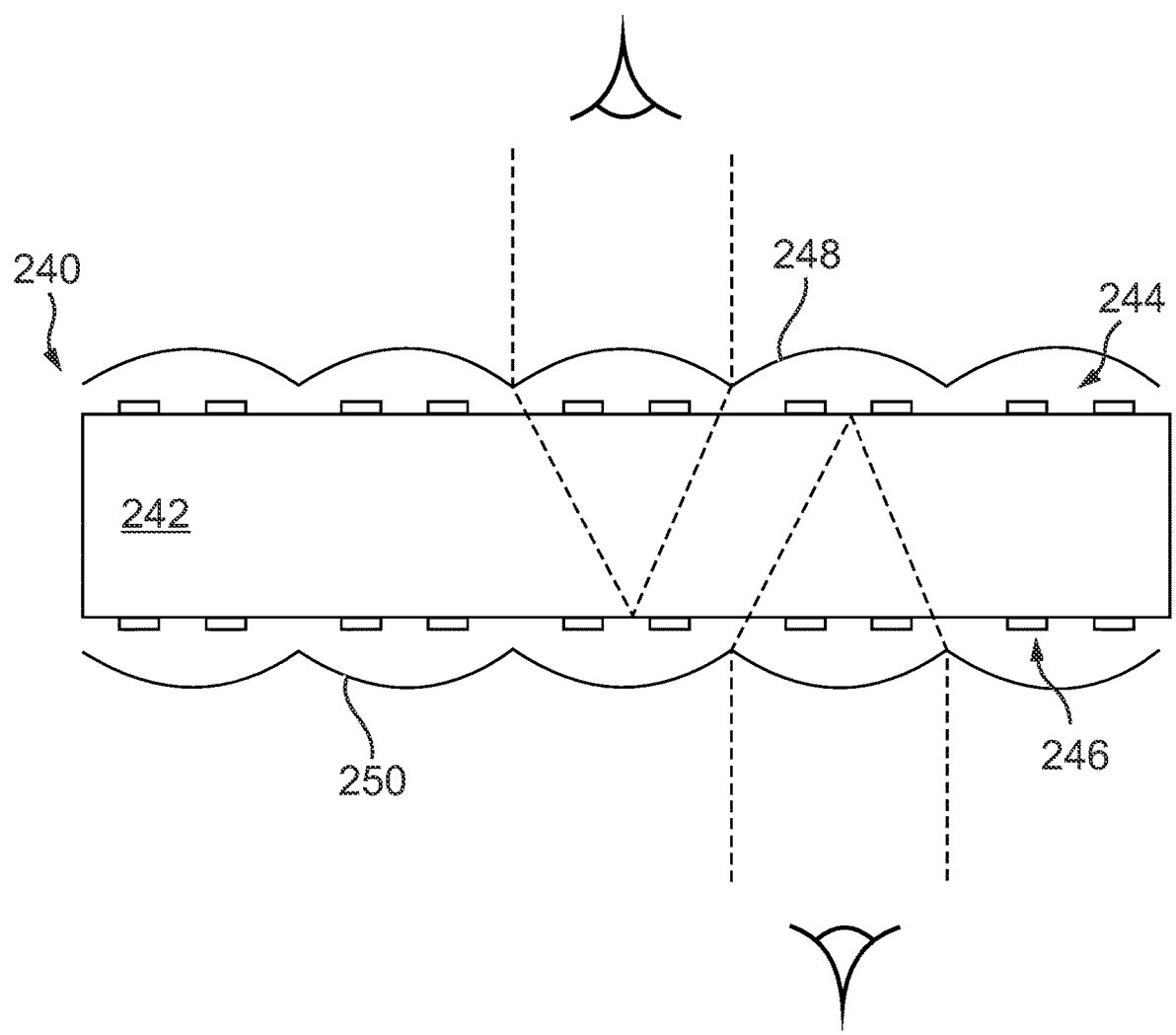
FIG. 19 is a cut-away side view of a fourth embodiment of a micro-optic device according to the present invention.

In the embodiments depicted in FIGS. 11 to 18, the image elements are applied to or embossed as part of the lens elements. However in a further embodiment depicted in FIG. 19, image elements are applied to both sides of a substrate first and lens elements are subsequently applied over the top of the image elements. As can be seen from this figure, the exemplary security device 240 includes a substrate 242 with an array 244 of image elements applied to a first side and an array 246 of image elements applied to a second side of the substrate 242. The arrays 244 and 246 of image elements can be applied, for example, by embossing with coloured UV ink, by embossing with clear UV ink and then overprinting with a thin layer of coloured ink or by filling image structures in a shim with coloured UV-curable ink then optionally removing UV-curable ink from non-image areas of the shim then UV-curing and lifting image structures out of the shim optionally using a lift-off layer.

The lens structures including lens elements are then applied on top of the imagery structures. Accordingly, the lens structure 248 including a series of lens elements acting to sample and magnify the array 246 of image elements, is formed over the array 244 of the image elements whereas a lens structure 250, is applied over the array 246 of image elements and the lens elements forming part of the lens structure 250 act to sample and magnify the array 244 of image elements on the other side of the substrate.

The embodiments depicted in FIGS. 11 to 19 all include lens elements on the first side of the substrate that sample and magnify image elements on the second side of the substrate and lens elements on the second side of the substrate that sample and magnify image elements on the first side of the substrate, where all lens elements and image elements occupy the entirety of the security device.

Figure 20:
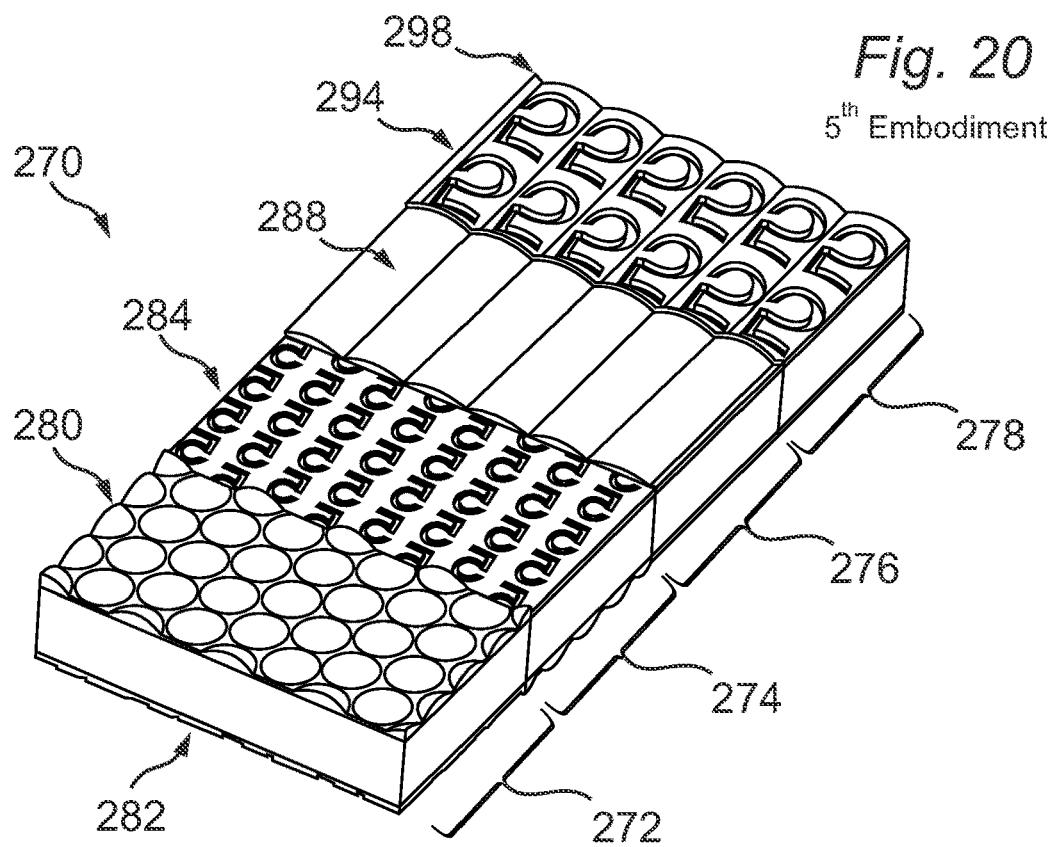
FIGS. 20 and 21 are respectively isometric top and bottom views of a fifth embodiment of a micro-optic device according to the present invention.
Figure 21:
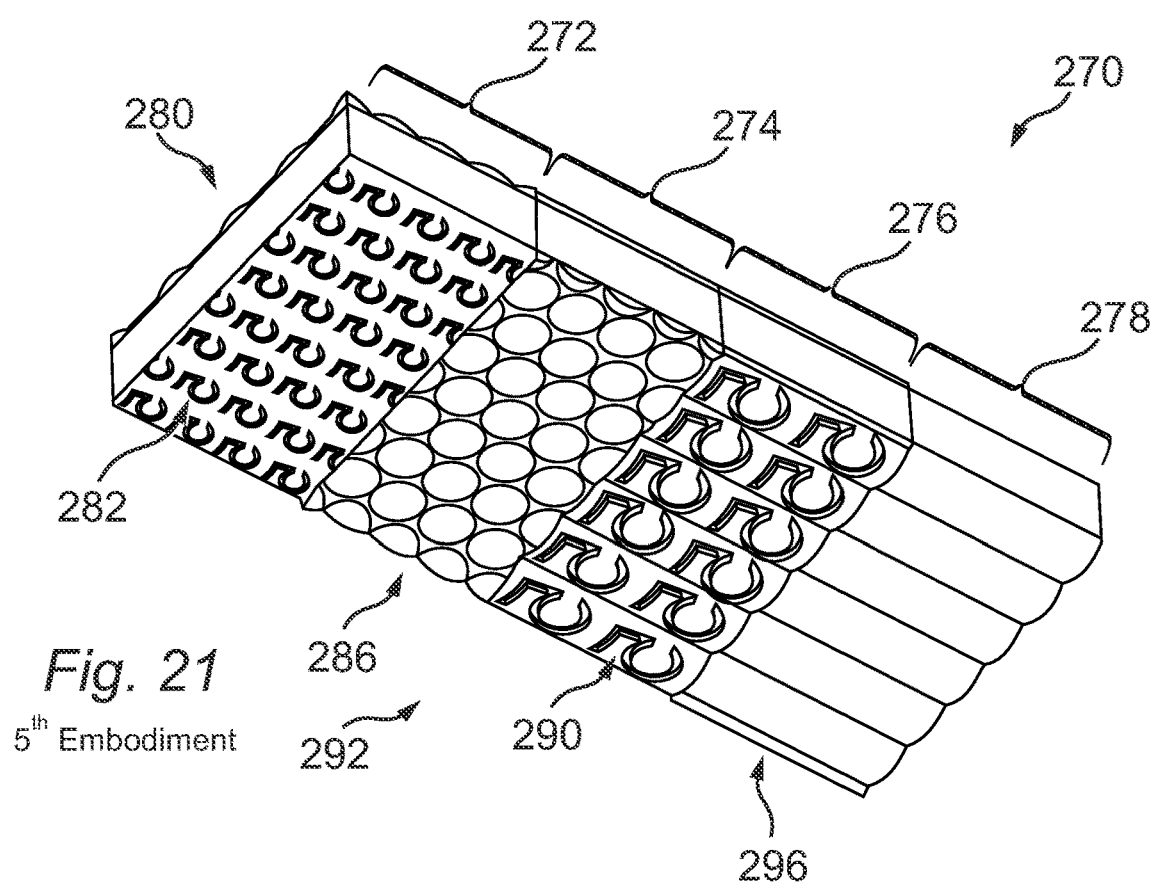

In other embodiments however, the security device may consist of more than one region where each region includes at least part of the first side of the substrate overlying at least part of the second side of the substrate. Such an arrangement is depicted in FIGS. 20 and 21 where it can be seen that the security device 270 includes four separate regions 272, 274, 276 and 278.

Although the security device includes lens elements and image elements on both sides of the substrate, some regions only include one array of image elements on one side and one array of corresponding lens elements on the other side. The first region 272 of the security device 270 includes a group 280 of lens elements, in this case hexagonally packed lenticular elements, applied to a first side of the substrate and overlying group 282 of image elements applied to the second side of the substrate. The second region 274 of the security device 270 also includes lens elements and image elements located on opposing sides of the substrate however, in this case, the region 274 includes a group 284 of image elements applied to the first side of the substrate overlying a group 286 of lens elements applied to the second side of the substrate.

The region 276 of the security device 270 includes a first group 288 of lens elements, in this case cylindrical lenticular elements, applied to the first side of the substrate overlying a group 290 of lens elements applied to the second side of the substrate. In addition, a group of image elements 292 are applied to form in or as part of the lens elements 290 on the second side of the substrate. In other words, the region 276 includes groups of lens elements applied to opposing sides of the substrate, but image elements applied to only one of those sides.

Similarly, the region 278 of the security device 270 includes a group 294 of lens elements applied to the first side of the substrate overlying a group 296 of lens elements applied to the second side of the substrate, and additionally a group 298 of image elements supplied on or formed as part of the group 294 of lens elements applied to the first side of the substrate. In other words, the region 278 includes two groups of lens elements applied to opposing surfaces of the substrate but only one group of image elements applied to one of the two groups of lens elements.

It will be appreciated that in spite of the variation in the number of groups of lens elements and image elements applied to either surface of each of the four regions 272 to 278, the security device 270 nevertheless includes revealing elements and image elements on both sides of the substrate.

It will be appreciated that embodiments of the invention in which the optical effect image on each side of the substrate occupies the same region, require individual lens elements on one side to be integrated with a portion of the image element structure on that same side. Where this occurs, the active area of each individual lens element that performs the revealing effect is reduced. Depending on the imagery design that is used, the contrast and fidelity of the resulting optical effect image may also be reduced. This is particularly true when an integral or interlaced image design is used, because image elements of such designs may occupy a large proportion of the area of some lens elements, and the corresponding portion of the optical effect image projected by such lenses (that have a reduced active area) will have reduced contrast and clarity.

Figure 22:
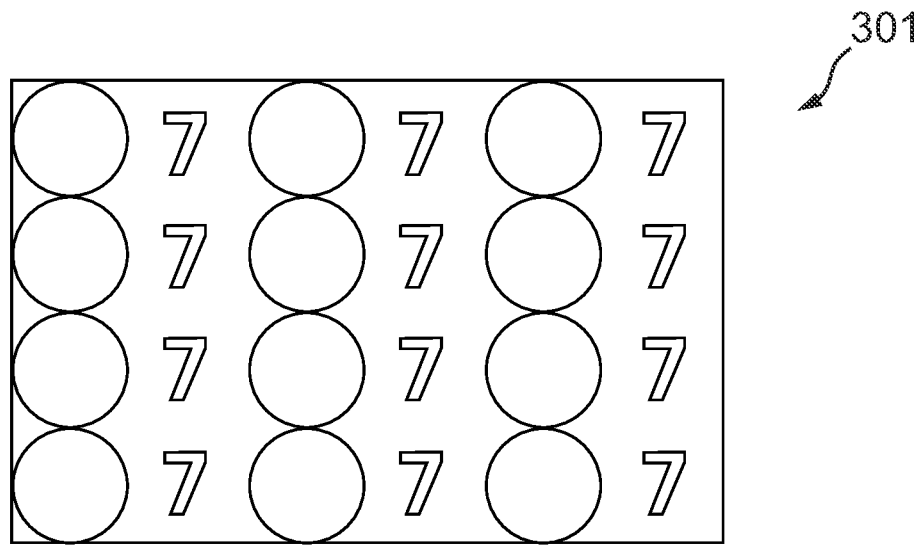
FIGS. 22 and 23 are respectively bottom and top views of an arrangement of lens and image elements for use in one or more embodiments of a micro-optic device according to the present invention.

An arrangement of lens and image elements which potentially addresses this problem is shown in FIG. 22, which shows interleaved arrays 301 of lens elements and image elements of the numeral "7" on bottom side of the substrate (as seen looking through the substrate to the bottom side), and interleaved arrays 303 of lens elements and image elements of the numeral "5" on the top side of the substrate, which overlap so that the lens elements on each side precisely overlay the image elements on the other side, resulting in a moiré magnification effect visible from each side. In this arrangement, the entire area of each lens element is used to produce the revealing effect, resulting in good image fidelity. Furthermore, 50% of the feature area on each side of the substrate is filled with lenses, so the image contrast is reduced relative to an equivalent single-sided lens feature made in accordance with the prior art.

Figure 23:
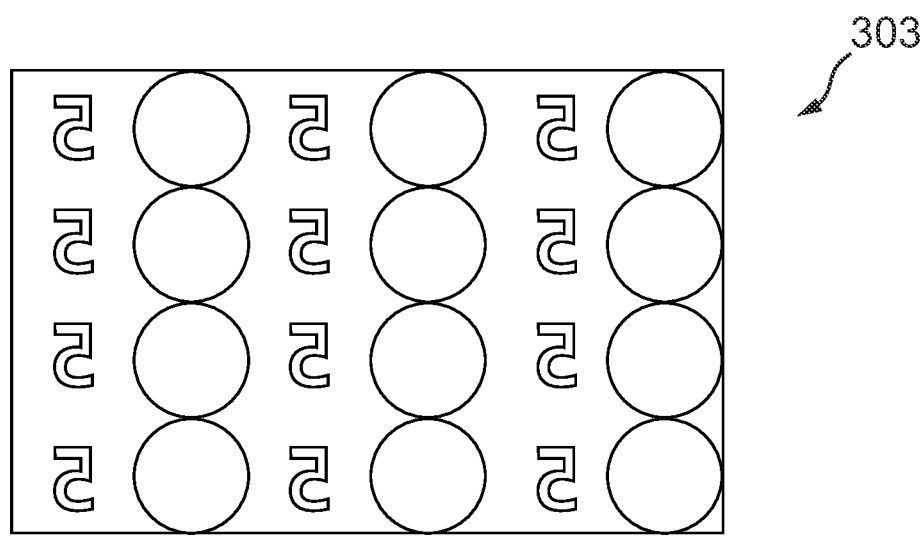
Figure 24:
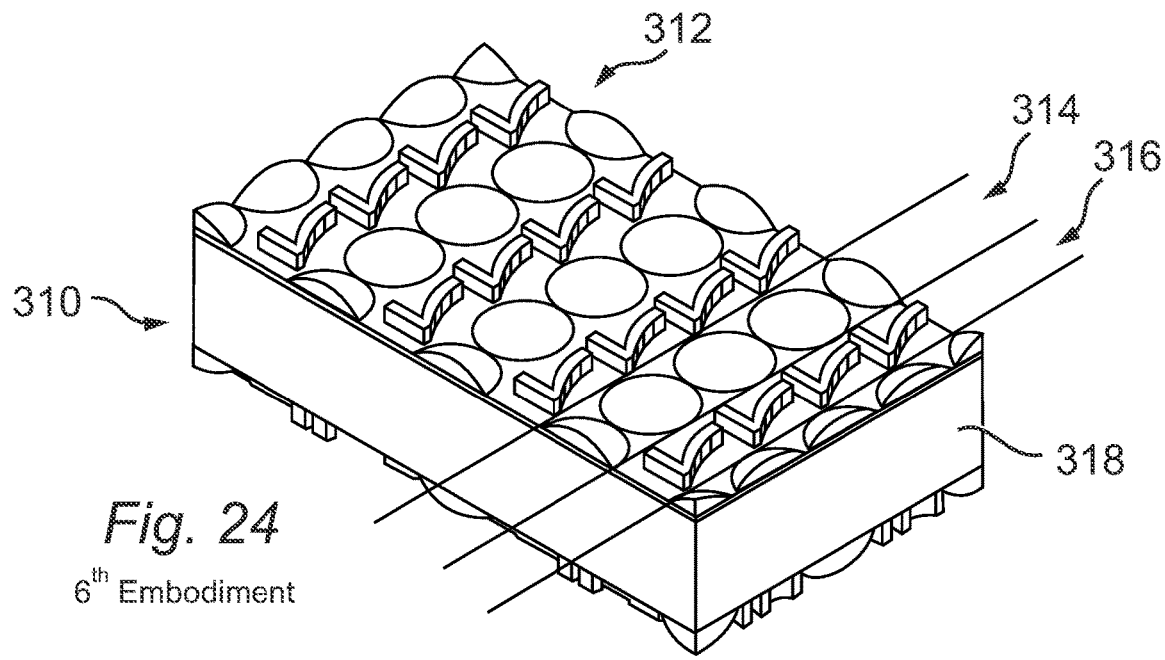
FIGS. 24 and 25 are respectively isometric top and bottom views of a sixth embodiment of a micro-optic device according to the present invention.
Figure 25:
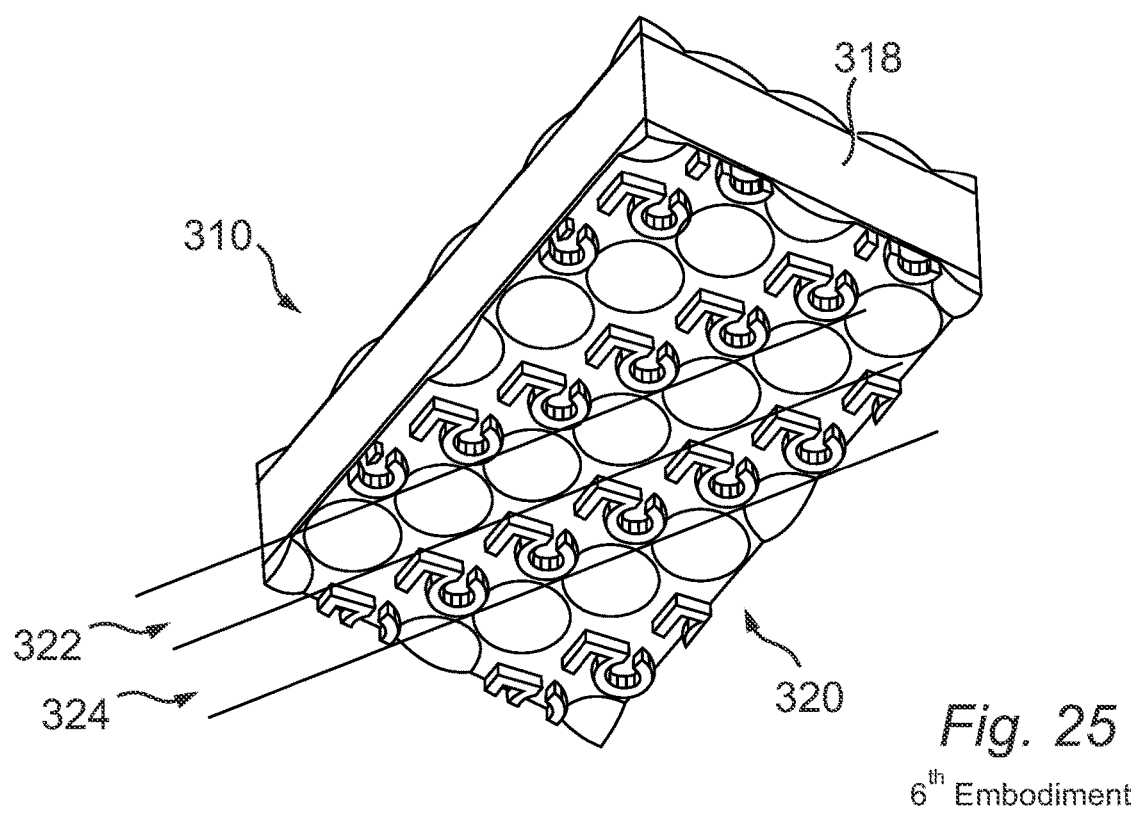
Figure 26:
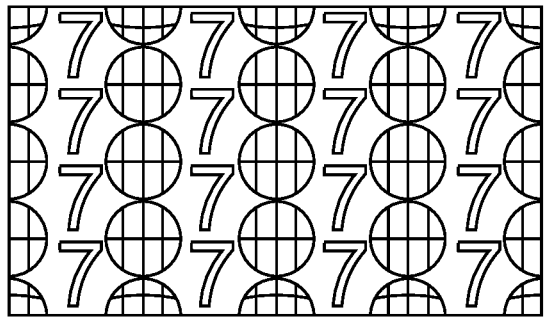
FIGS. 26 to 29 are top and bottom views of the micro-optic device shown in FIGS. 24 and 25.
Figure 28:
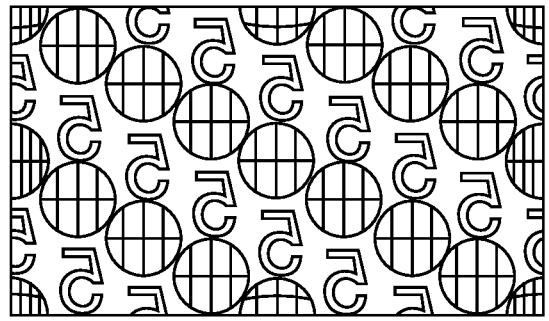
Figure 27:
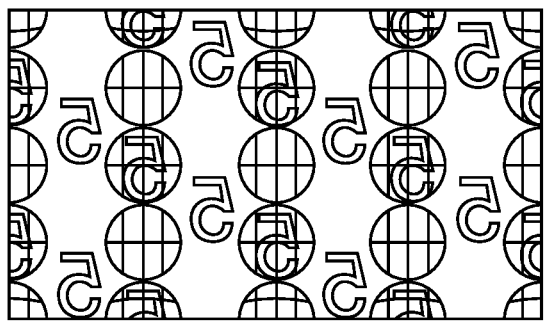
Figure 29:
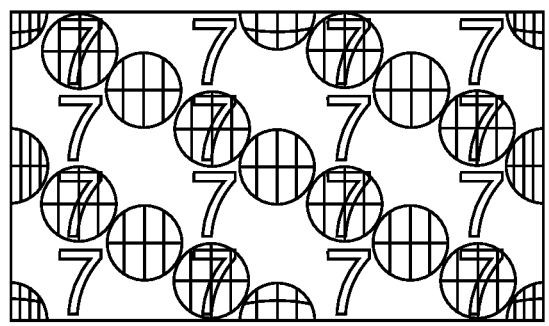

The arrangement shown in FIGS. 22 and 23 requires the lenses and imagery on one side to be positioned very precisely with respect to the lenses and imagery on the other side (to ensure lenses on one side will sample and magnify imagery on the other side); in fact the positioning tolerance required is a fraction of the width of one lens element. This tolerance cannot be achieved with existing manufacturing processes. An alternative embodiment which addresses this problem is depicted in FIGS. 24 to 29.

In FIGS. 24 to 29 it will be appreciated that the magnified optical effect image on each side of the substrate is composed of "pixels" of micro lenses that focus/magnify corresponding image elements on the other side. A "pixel" exists only where a focusing element is able to magnify a portion of an image element on the other side of the substrate.

The embodiments in FIGS. 24 to 29 include a distribution of lens elements and image elements on each side which ensure that a magnified image effect produced by the lenses on each side will always consist of substantially the same number of pixels, regardless of the registration in X and Y directions in the plane of the substrate of the lens elements relative to the image elements that they are focusing on or magnifying. This ensures that images produced are consistent in brightness and contrast from one bank note or other security document to the next.

In a typical roll-to-roll manufacturing process, registration tolerance may be in the order of +/−0.25 mm, this being much bigger than the dimension of a typical micro lens for a bank note. As a consequence, registration of lens elements and image elements in the X and Y directions cannot be controlled by improved manufacturing techniques. In order to produce consistent images, that is, images with the same number of pixels, it is desirable to provide an arrangement of lens elements and image elements that will produce a fixed number of magnified pixels, independent of any registration "errors" in the X and Y directions.

The embodiments in FIGS. 24 to 29 illustrate this point. The security device 310 includes lens elements and image elements on a first side 312, that are hexagonal packed and have a pitch of 56 microns. The lens and image regions are interleaved as strips such as exemplary strips 314 and 316. The lens strips and imagery strips each occupy 50% of the area on the side 312 of the substrate 318. Lens elements and image elements on the other side 320 of the substrate 318, are also hexagonally packed with the same orientation as the opposite side 312 of the substrate 318 and have a pitch of 56.3 microns. Lens elements and image elements are arranged in interleaved strips, such as exemplary strips 322 and 324 but are rotated 60 degrees relative to the strips 314 and 316 on the side 312 of the substrate.

In such an arrangement the lenses on the side 312, will moiré-magnify 50% of the imagery on side 320. The moiré-magnified pixels will therefore occupy 50%×50% equals 25% of the total area. The contrast in the moiré-magnified image will therefore be 25% of the contrast in an equivalent single sided lens feature in which the imagery occupies 100% of the area and 100% of the image elements are magnified. Accordingly, a double sided lens feature that is registration tolerant, in which the individual lens elements on one side are not integrated with a portion of the image elements on that same side, will produce images with less contrast than an equivalent single sided feature. However, both sides of the substrate will generate optical image effects for use and authenticating the bank note or other security document.

The lenses on the side 320 will moiré-magnify 50% of the image elements on the side 312. Once again the moiré-magnified pixels will therefore occupy 50%×50% equals 25% of the total area. The contrast in the moiré-magnified image will again be 25% of the contrast in an equivalent single sided lens feature in which the imagery occupies 100% of the area and 100% of the imagery is magnified.

The packing of the lens and image elements on both sides 312 and 320 of the security device 310 as well as the correspondence between the image elements on one side and the lens elements that sample and magnify those image elements on the other side, are seen in FIGS. 24 to 29.

Variations in the above described embodiments depicted in FIGS. 24 to 29 may include:
(i) Lenses are applied in a plurality of regions on both sides of the polymer substrate; and
(ii) Imagery is applied in a plurality of regions on both sides of the polymer substrate; and
(iii) The lens and imagery regions on each side are separated and are located/distributed so that the lenses on each side focus/magnify a substantially fixed proportion of the imagery on the other side, irrespective of their relative phase/offset in two mutually orthogonal directions in the plane of the substrate;
(iv) Preferably the fixed proportion is 25% and the two mutually orthogonal directions are the machine direction and cross direction in either a roll-to-roll process for applying lenses and/or imagery or a sheet fed process for applying lenses and/or imagery;
(v) Preferably the lens and imagery regions on each side consist of strips of lens regions interleaved with strips of image regions—wherein the strips on one side are not parallel to the strips on the other side;
(vi) If rectangular packed lenses are used on both sides: preferably the interleaved strips on one side are orthogonal to the interleaved strips on the other side;
(vii) If hexagonal packed lenses are used on both sides: preferably the interleaved strips on one side are rotated 60 degrees (in the plane of the substrate) relative to the interleaved strips on the other side;
(viii) If cylindrical lenses are used on both sides: preferably the interleaved strips on one side are orthogonal to the interleaved strips on the other side;
(ix) If cylindrical lenses are used on both sides: preferably the cylindrical axis on one side is orthogonal to the cylindrical axis on the other side.

In one or more embodiments, the pitch of the lens elements on each side, and the orientation of the lens elements on one side relative to the lens elements on the other side, are selected so that either
(iii) the moiré magnified image of the lens element is larger than the optical effect image on each side; or
(iv) the moiré magnified image of the lens element is smaller than what can be discerned by the naked eye.
Preferably the moiré magnified image of the lens element is less than 0.1 mm.

The pitch and relative skew required, to produce a desired moiré magnification, can be calculated using known moiré magnification formula. For example, the following moiré magnification formula (taken from Amidror, The Theory of the Moire Phenomenom, 2000) can be used to calculate the size of the moiré magnified image, for a given lens pitch on each side, and for a given relative skew between the lenses on each side (in the below $T_1$ and $T_2$ refer to the lens pitch on each side, a is the relative skew angle, and $T_M$ is the size of the moiré magnified image):

$$T_M = \frac{T_1 T_2}{\sqrt{T_1^2 + T_2^2 - 2T_1 T_2 \cos\alpha}}$$

Figure 30:
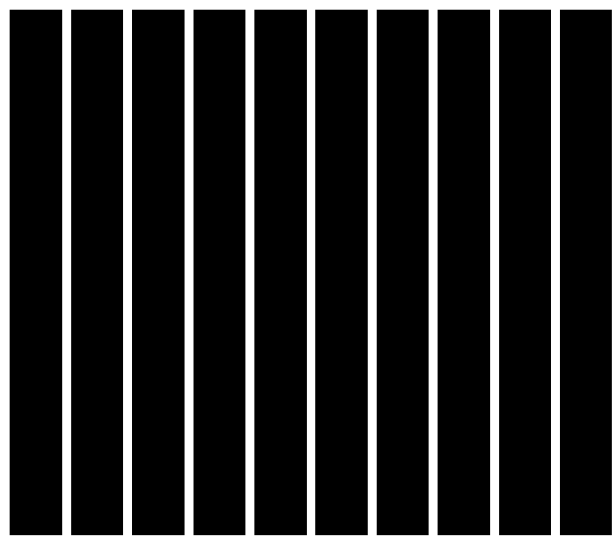
FIGS. 30 and 31 show examples of sampling screens for use respectively as part of a seventh and eighth embodiment of a micro-optic device according to the present invention.
Figure 31:
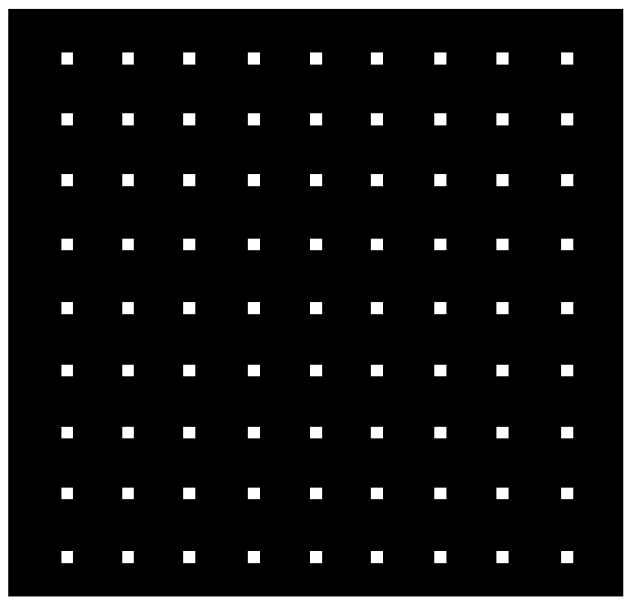

The revealing elements of the invention can also be provided in the form of a sampling screen provided on one or both sides of the substrate. Each sampling screen may consist of a grid 313 of parallel lines as seen in FIG. 30, or a grid 315 of rectangular or hexagonally arranged holes as seen in FIG. 31, through which light may pass. Ambient light scattered from image elements located on the other side of the substrate reaches the viewer after passing through the sampling screen, producing an optical effect image that can be seen by the observer. The repeat distance (pitch) from each line (or hole) to the next adjacent line (or hole) defines the frequency with which the image elements on the other side of the substrate are sampled. As the viewing angle is changed, the sampling screen samples a different portion of the image element underneath, just like a micro lens. Preferably, the repeat distance (pitch) of the sampling screen is substantially the same as the repeat distance (pitch) of the micro lens elements of an equivalent structure that employs micro-lenses rather than a sampling screen.

The sampling screen may be realised by printing a pattern that leaves lines or holes in the non-printed areas, or alternatively by embossing a structure in which the lines or holes are formed in the non-embossed areas. If the sampling screen is embossed, the embossed structure may consist of light extinguishing structures, or diffraction gratings, or high roughness surface texture. If the sampling screen is embossed, the sampling screen structure may form part of a unitary structure consisting of image element structures that are integrated with sampling screen structures. FIGS. 30 and 31 show examples of possible sampling screens—the dark areas depict areas that would be either printed or altered by embossing. Compared to using refractive micro-lenses, sampling screens generally produce optical effect images with relatively less image contrast/brightness, because each sampling screen element projects to the eye a smaller proportion of the light that is scattered from each image element.

Where sampling screens are used as revealing elements, care should be taken to ensure that each sampling screen does not moiré magnify the revealing elements on the other side of the substrate. The same methods described earlier, namely suitable selection of revealing element pitch and/or relative skew between revealing elements, may be used to ensure moiré magnification of revealing elements does not occur when sampling screens are used.

Figure 35:
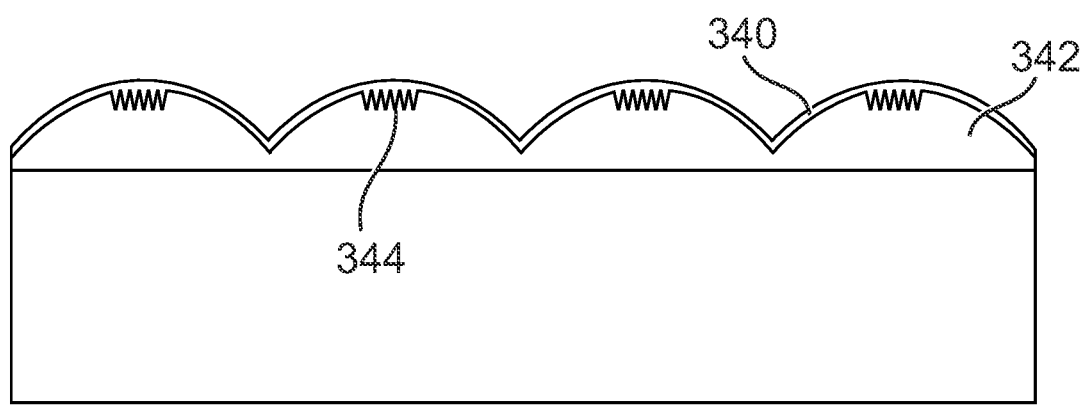
FIG. 35 is a cutaway side view of a unitary structure of image elements and lens elements, to which an overcoat layer is applied, for use in one or more embodiments of a micro-optic device according to the present invention.

In all of the embodiments described above that employ embossed revealing elements and image elements, the revealing elements and/or image elements may be over coated with a thin layer of material that has a different refractive index than that of the UV cured resin in which the revealing elements and image elements are formed. As seen in the example in FIG. 35, application of such a thin layer 340 to a structure including one or both of lens elements 342 and image elements 344 can prevent the image elements from being copied through electro-forming because the surface structure of the image elements is now flat when compared to the surrounding and adjacent lens elements. If the layer is sufficiently thin compared to the sag of the refractive lens element 342 it will not adversely the imaging function or focal length of the lens element.

If the lens elements used are diffractive lens elements, these may also be over coated with a thin layer of material that has a different refractive index than that of the UV cured resin in which the diffractive lens elements are formed. In this case the depth of the diffractive lens structure is adjusted to accommodate the thickness of the thin layer of material that has different refractive index to that of the UV cured resin in which the diffractive lens elements are formed, so that constructive interference at the desired focal length of the diffractive lens element is maintained.

Another benefit from such an arrangement is that sweat or other liquids are prevented from filling the imagery and/or lens structures. For example if the imagery structure consists of a diffraction grating that creates a coloured magnified image, the magnified image will be largely lost if the structure becomes filled with water, since water has a similar refractive index to the UV embossed resin of structures. Similarly, if the lens structure used is diffractive, the focusing function of the lens will be largely lost if the structure becomes filled with water, because the lens will be unable to correctly modulate the phase of the light to ensure constructive interference at the focal point.

The 2D or 3D revealing elements and image elements described herein can be formed by any suitable manufacturing process, including the following non-limiting exemplary security print processes: offset, foil application, screen printing, intaglio, letterpress and overcoating. In embodiments described herein, an embossing shim is used to emboss the unitary structure, including a focusing structure of focusing elements and an imagery structure of image elements, on one or both sides of the substrate. A number of different techniques for manufacturing such an embossing shim are described below:

Laser Micro-Machining Approach/Laser Lithography

Excimer laser micro-machining has been used in the past to machine 3-D micro-structures including masters for mould tooling (see for example: Jolic K I, Ghantasala M K and Harvey E C, "Excimer laser machining of corner cube structures", Journal of Micromechanics and Microengineering, Vol. 14, no. 3 (2004), pp. 388-397).

Excimer lasers have also been used in the past to make refractive micro-lens arrays (an example of a company who do this are Optec s.a., ZAE Le Crachet, Avenue des Nouvelles Technologies, 53, B-7080 Frameries Belgium).

Laser micro-machining techniques based on mask projection (i.e. laser ablation) could therefore be used to laser machine integrated refractive micro-lenses and micro-imagery, into a material such as polycarbonate, to form a master mould. The micro-imagery elements could be machined as recessed areas in the master mould. They could also be machined as micro-structured surface texture. The master mould could then be electroplated, to form an embossing metal shim.

Alternatively, the micro-lenses (concave or convex or diffractive) could be pre-fabricated (using established methods—for example hot-embossing) in a material such as polycarbonate. Laser micro-machining techniques based on mask projection could then be used to laser machine the micro-imagery directly into the lenses (the micro-imagery elements could be machined as recessed areas that are flat; they could also be machined as micro-structured surface texture) to complete the integrated master mould. The master mould could then be electroplated to form an embossing metal shim.

Alternatively, laser micro-machining techniques using mask projection could be used to make the imagery component of the integrated structure as follows: (i) coat the lens metal master (concave or convex or diffractive; previously fabricated using established techniques e.g. electroforming from lens master mould) with a layer of laser machine-able dry film resist; (ii) use laser to micro-machine 2-D imagery pattern in the dry film resist to expose underlying lens metal layer (i.e. remove dry film resist completely in areas corresponding to imagery pattern); and (iii) chemically etch the exposed metal areas to make these areas recessed &/or textured—or alternatively electroplate the exposed areas to make these areas extend above the neighbouring lens surface.

UV Lithography Technique

UV lithography techniques may also be used to fabricate master moulds of integrated micro-lenses and micro imagery structures. This could be achieved as follows: (i) coat the lens metal master (concave or convex or diffractive—previously fabricated using established techniques e.g. electroforming from lens master mould) with a (preferably planar) layer of photo-resist; (ii) use mask aligner to UV-expose the 2-D imagery pattern in the photoresist; (iii) chemically develop the UV-exposed photoresist layer so as to expose the underlying metal layer of the lens master in the areas of the 2-D imagery pattern; (iv) chemically etch the exposed metal areas to make these areas recessed &/or textured—or alternatively electroplate the exposed areas to make these areas extend above the neighbouring lens surface.

Direct Laser Writing

It is conceivable that direct laser writing methods (maskless laser lithography, grey tone lithography) could also be used to manufacture integrated micro lens and micro imagery structures, including lens structures that are refractive or diffractive, and imagery structures that are diffractive. These methods involve X-Y raster scanning a laser beam that is focused on the photoresist surface. The dosage of the laser beam is spatially varied in X and Y, in accordance with the desired structure depth at each point. The photoresist is then developed to produce the 3-D surface. An example machine with this technology is the DWL 425 (Heidelberg Instruments, Germany).

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

It will be understood that the invention is not limited the specific embodiments described herein, which are provided by way of example only. The scope of the invention is as defined by the claims appended hereto.

The claims defining the invention are as follows:

1. A micro-optic device, including:
   a transparent substrate;
   first revealing elements on a first side of the substrate that reveal first image elements on a second side of the substrate; and
   second revealing elements on the second side of the substrate that reveal second image elements on the first side of the substrate,
   wherein the second image elements are incorporated into a first physical structure of the first revealing elements and the first image elements are incorporated into a second physical structure of the second revealing elements.

2. A micro-optic device as claimed in claim 1, wherein the first unitary structure and the second unitary structure are formed by embossing.

3. A micro-optic device as claimed in claim 2, wherein the first unitary structure and the second unitary structure are formed by a single embossing action.

4. A micro-optic device as claimed in claim 1, wherein the first image elements are located in a single image plane on the second side of the substrate or the second image elements are located in a single image plane on the first side of the substrate.

5. A micro-optic device as claimed in claim 1, wherein the first and/or second image elements are recessed with respect to neighbouring revealing elements.

6. A micro-optic device as claimed in claim 1, wherein the first and/or second image elements are raised with respect to neighbouring revealing elements.

7. A micro-optic device as claimed in claim 1, wherein a height of the first and/or second image elements is the same as a height of one or more neighbouring revealing elements.

8. A micro-optic device as claimed in claim 7, wherein the first and/or second image elements forms a flat pattern.

9. A micro-optic device as claimed in claim 1, wherein the first and/or second image elements are comprised of diffraction gratings.

10. A micro-optic device as claimed in claim 1, wherein the first and/or second image elements comprise a light diffusing or light extinguishing pattern.

11. A micro-optic device as claimed in claim 1, wherein one or more of first revealing elements, second revealing elements, first image elements and second image elements are overprinted with coloured ink.

12. A micro-optic device as claimed in claim 1, wherein the first and second revealing elements are first and second lens elements that sample and magnify the first and second image elements respectively.

13. A micro-optic device as claimed in claim 12, wherein the first and second lens elements are either refractive and cause light to be focused on a focal point or diffractive and cause constructive interference of light at a focal point.

14. A micro-optic device as claimed in claim 12, wherein the first and second image elements lies within a depth of focus of the first and second revealing elements respectively.

15. A micro-optic device as claimed in claim 12, wherein the first and second lens elements are cylindrical lenticular lens elements.

16. A micro-optic device as claimed in claim 12, wherein the first and second lens elements are circular lens elements.

17. A micro-optic device as claimed in claim 1, wherein the first and/or second unitary structures are applied as a foil.

* * * * *